(12) United States Patent  (10) Patent No.: US 7,077,546 B2
Yamauchi et al.  (45) Date of Patent: Jul. 18, 2006

(54) ILLUMINATION APPARATUS AND LIQUID CRYSTAL PROJECTOR USING THE ILLUMINATION APPARATUS

(75) Inventors: Satoshi Yamauchi, Kanagawa (JP); Kazuhiro Fujita, Tokyo (JP); Tadashi Honda, Kanagawa (JP); Osamu Nagase, Iwate (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 11/039,921

(22) Filed: Jan. 24, 2005

(65) Prior Publication Data

US 2005/0128435 A1 Jun. 16, 2005

Related U.S. Application Data

(63) Continuation of application No. 10/125,493, filed on Apr. 19, 2002, now Pat. No. 6,866,404.

(30) Foreign Application Priority Data

Apr. 23, 2001 (JP) .............................. 2001-123923
Aug. 31, 2001 (JP) .............................. 2001-263890

(51) Int. Cl.
*F21V 7/00* (2006.01)
(52) U.S. Cl. ........................................ 362/301; 362/296
(58) Field of Classification Search ........ 362/298–300, 362/304, 261; 349/9, 5, 67; 353/122; 359/621
See application file for complete search history.

(56) References Cited

U.S. PATENT DOCUMENTS

| 3,676,667 A | 7/1972 | Malifaud |
| 4,735,495 A | 4/1988 | Henkes |
| 5,142,387 A | 8/1992 | Shikama et al. |
| 5,151,584 A * | 9/1992 | Ebbing et al. ............ 250/201.4 |
| 5,833,341 A * | 11/1998 | Kimura et al. ................ 353/98 |
| 6,227,682 B1 * | 5/2001 | Li ................................ 362/302 |
| 6,497,488 B1 | 12/2002 | Yamauchi et al. |
| 2003/0031031 A1 * | 2/2003 | Tiao et al. .................... 362/560 |

FOREIGN PATENT DOCUMENTS

| JP | 03111806 A | 5/1991 |
| JP | 05264904 A | 1/1993 |
| JP | 10161065 A | 6/1998 |
| JP | 20011066697 A | 3/2001 |

* cited by examiner

*Primary Examiner*—Ali Alavi
(74) *Attorney, Agent, or Firm*—Dickstein Shapiro Morin & Oshinsky LLP

(57) ABSTRACT

An illumination apparatus includes a reflector including a parabolic or ellipsoidal mirror, a light source arranged near a (first) focal point of the reflector, and a front mirror having a transparent window and a mirror surface symmetrical about the light axis. Luminous flux emitted from the light source is reflected from the reflector. In the case of the parabolic mirror, the front mirror has the same size as an entrance of an output light utilizing optical system, and the luminous flux exits toward the optical system as collimated light. In the case of the ellipsoidal mirror, the front mirror is arranged between two focal points of the ellipsoidal mirror, and the luminous flux is directed toward the second focal point. However, at least one part of the luminous flux is reflected from the front mirror and returned toward the first focal point.

13 Claims, 32 Drawing Sheets

FIG.14
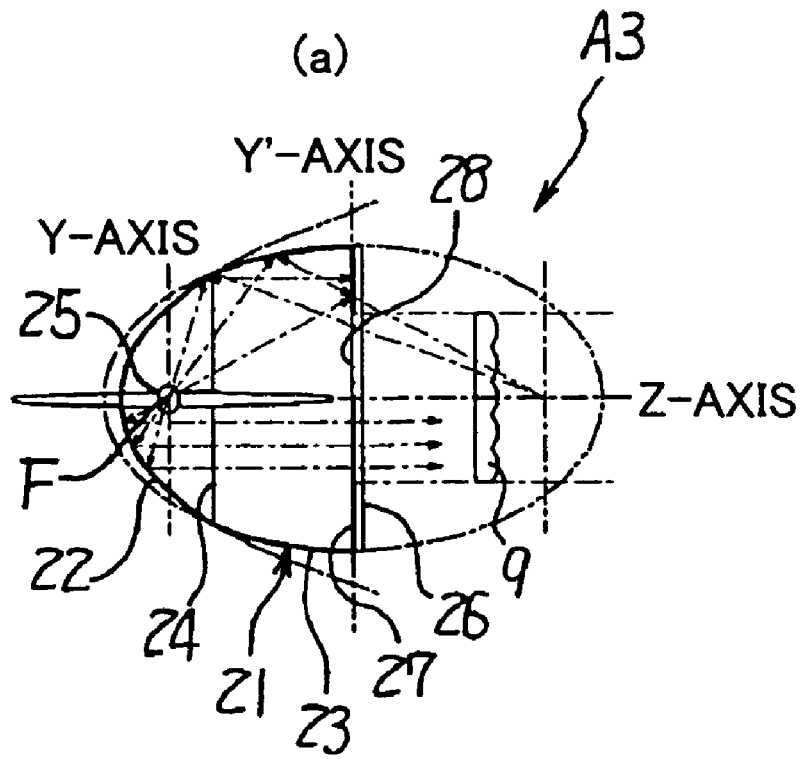
(a)
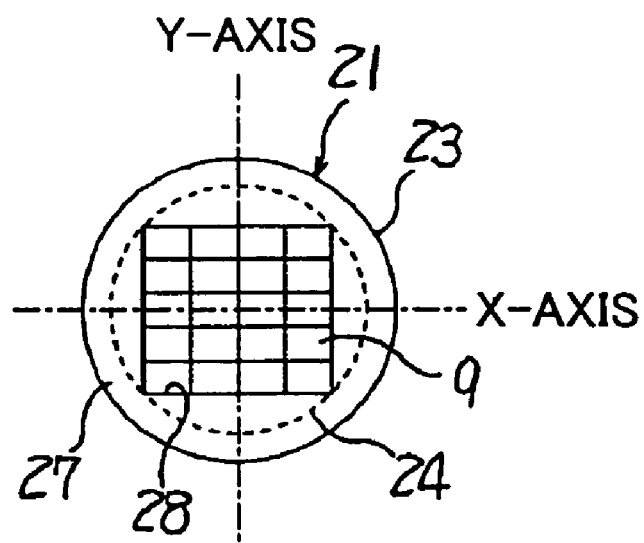
(b)

FIG.15
(a)
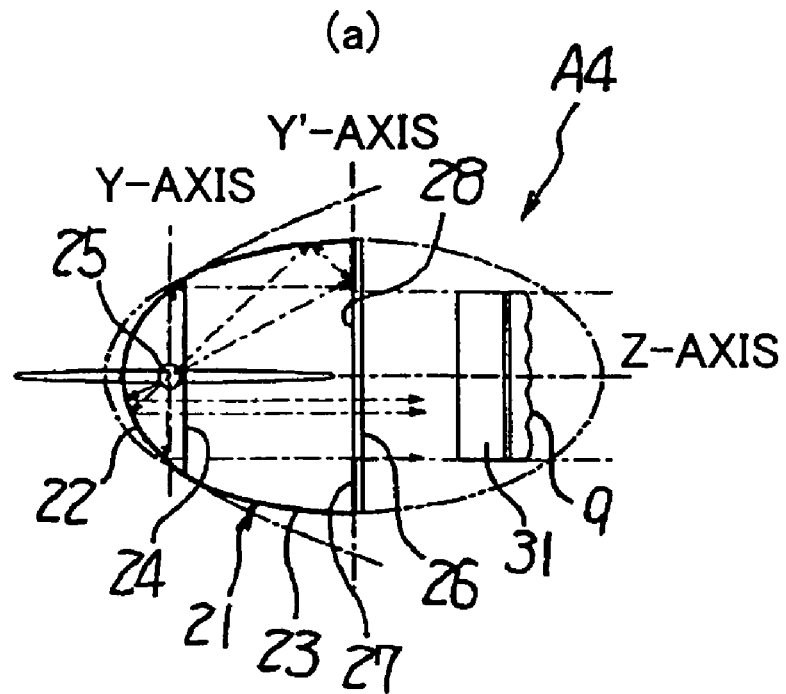
(b)
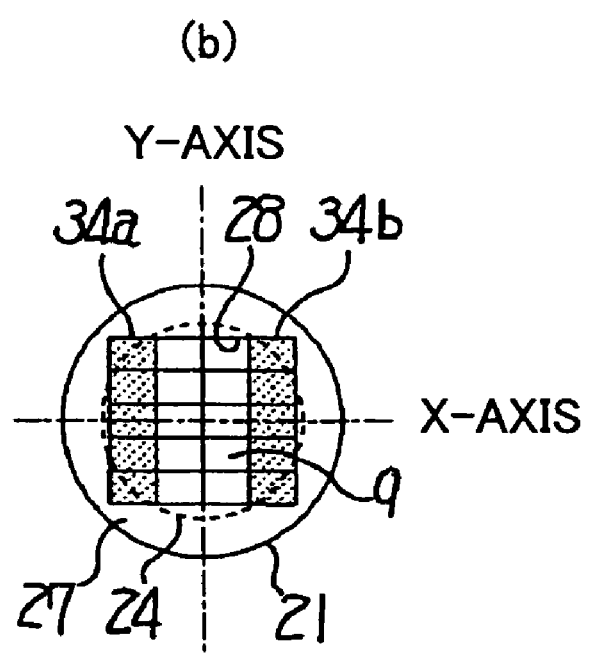

ILLUMINATION APPARATUS AND LIQUID CRYSTAL PROJECTOR USING THE ILLUMINATION APPARATUS

This application is a continuation of U.S. patent application Ser. No. 10/125,493, filed on Apr. 19, 2002, now U.S. Pat. No. 6,866,404, which is incorporated herein by reference.

BACKGROUND OF THE INVENTION

1. Field of the Invention

The present invention relates to an illumination apparatus suitable for illuminating a rectangular object such as a liquid crystal panel, and a liquid crystal projector using such an illumination apparatus.

2. Description of the Related Art

As for an illumination optical system for uniformly illuminating a rectangular object such as a liquid crystal panel, an integrator optical system in which two fly-eye lens-arrays are combined is known from, for example, Japanese Laid-Open Patent Application No. 3-111806.

The integrator optical system shown in the above patent application divides a luminous flux originating from a light source with a reflector such as a parabolic reflector, an ellipsoidal reflector and a hyperbolic reflector, by multiple rectangular focusing lenses constituting a first fly-eye lens-array to form secondary light source images. A convolution of the secondary light source images is imaged on one illuminated object through a second fly-eye lens-array having multiple focusing lenses corresponding to the multiple rectangular focusing lenses of the first fly-eye lens-array. According to such an integrator optical system, it is believed that intensity distribution of light on a surface of the illuminated object can be made almost uniform as well as usability of light from the light source being improved. Particularly, the usability of light and uniformity of intensity distribution can be improved by matching shapes of respective focusing lenses of the first and the second fly-eye lens-array to an aspect ratio of the rectangular illuminated object, for example, by making the focusing lens into a rectangular shape having the ratio of a long side and a short side of 4:3.

That is, in Japanese Laid-Open Patent Application No.3-111806, an integrator optical system using a first macro-lens array, of which the common name is fly-eye lens plate, having rectangular lenses on a first lens plate and a second macro-lens array having lenses corresponding to the lenses on the first lens plate can make illumination matching an aspect ratio of an illuminated object. Then, as for an example of a configuration at the light source side in order to make the size of the integrator optical system compact, a light source is placed at a first focal point of an ellipsoidal mirror, a collimator lens is located behind a second focal point of the mirror, and an integrator optical system is arranged behind the collimator lens, as shown in FIG. 1 that is also drawn in Japanese Laid-Open Patent Application No.3-111806.

Also, FIG. 2 shows a configuration example including a parabolic mirror instead of the ellipsoidal mirror shown in FIG. 1.

In FIG. 1 and FIG. 2, basically, illumination with an aspect ratio suitable for a liquid crystal panel 103 as an illuminated object is performed using a first macro-lens array or a first fly-eye lens-array 101 having rectangular lenses on a first lens plate in an integrator optical system 100 and a second macro-lens array or a second fly-eye lens-array 102 having lenses respectively corresponding to the rectangular lenses of the first fly-eye lens-array.

Then, at the light source side of the configuration shown in FIG. 1, light generated from a light source 105 arranged at a first focal point F1 of an ellipsoidal mirror 104 as a reflector, is reflected from the ellipsoidal mirror 104, and is focused to a second focal point F2, and enters the integrator optical system 100 by a collimator lens 107.

Also, at the light source side of the configuration shown in FIG. 2, light generated from a light source 105 arranged at a focal point F1 of a parabolic mirror 104 as a reflector is reflected from the surface of the parabolic mirror 104, collimated, focused to a point corresponding to a second focal point F2 of an ellipsoid having a first focal point at F1 by a convex lens 106, then enters the integrator optical system 100 by a collimator lens 107.

Herein, in FIG. 1 and FIG. 2, a polarization alignment prism array for aligning polarization of light generated from the light source with a mixture of a p-polarization component and a s-polarization component to only the s-polarization component or the p-polarization component is indicated with the numeral 108. Two lenses are also indicated with the numerals 109 and 110 in the FIG. 1 and FIG. 2.

According to the configuration example shown in FIG. 2, although the number of the members is one more than that of the example shown in FIG. 1, the size of a reflector and the position of a focal point of the reflector, which represents a parabolic mirror and an ellipsoid mirror, etc., can be freely defined.

Also, according to Japanese Laid-Open Patent Application No.10-161065, an illumination apparatus is proposed, in which a collimated light obtained from a light source placed at a focal point of a parabolic mirror is focused by a convex lens, collimated again by a concave lens and led to a polarization conversion means or an integrator optical system in order to decrease the size of the integrator optical system.

FIG. 3 shows an illumination apparatus based on the idea of Japanese Laid-Open Patent Application No. 10-161065. As compared with the illumination apparatus shown in FIG. 2, a collimating lens 111 is arranged at the near side or light source side of a point corresponding to a second focal point F2 of an ellipsoid having a first focal point at F1, wherein the collimator lens 107 is omitted.

Furthermore, according to Japanese Laid-Open Patent Application No. 5-264904, as shown in FIG. 4, similar to the case of the above mentioned Japanese Laid-Open Patent Application No. 3-111806, it is proposed that light generated from a light source 105 placed at a first focal point F1 of an ellipsoidal mirror 104 or a parabolic mirror is led to an integrator optical system 100 through a collimator lens 107 arranged behind a second focal point F2. Luminous flux not reflected by the surface of the ellipsoidal mirror 104 returns to the light source 105 using a concave mirror 112 having a spherical center at the first focal point F1. Thus most of the luminous flux generated from the light source 105 can be utilized.

Also, according to Japanese Laid-Open Patent Application No. 2001-66697, as shown in FIG. 5, it is proposed that a reflection film 214 on a part of a vessel 213 of a lamp 212 attached to a reflector 211 is formed to be a light source having a substantially spherical mirror structure so that the luminous flux generated from the light source is returned toward the reflector 211 side to be effectively utilized.

The idea shown in the aforementioned Japanese Laid-Open Patent Application No.3-111806 or in FIG. 1 and FIG. 2 is that luminous flux originating from the light source 105 is focused at once and collimated by the collimator lens 107 to decrease the whole size of the integrator optical system 100, thus achieving the comprehensive object. However, according to the configuration, the size of an image of the light source at the focal point, at which luminous flux originating from the light source 105 is focused again, is magnified to several times of the size of the original image of the light source and collimation by a collimator lens 107 is limited so that usability of light in the integrator optical system 100 is lowered. The property in the case of use of an ellipsoidal mirror instead of the parabolic mirror 104 shows the same tendency as the case of the combination of the parabolic mirror 104 and the convex lens 107.

Furthermore, in the case of the configuration example shown in FIG. 1, as a coverage angle θ of the ellipsoidal mirror 104 is increased, a maximum incidence angle Ψ is also increased, so that efficiency at the collimator lens is reduced and the illumination apparatus becomes complex because of needing many lenses, etc.

Also in the case of the configuration as shown in Japanese Laid-Open Patent Application No.10-161065 or in FIG. 3, in principle, collimated light exiting from the collimating lens 111 that is a concave-lens has the same degree of collimation as collimated light obtained by use of the collimator lens 107 shown in FIG. 2. As similar to the aforementioned example in the prior art, even if an ellipsoidal mirror is employed and the collimating lens 111 is placed at the near side of the second focal point. F2, the property shows a same tendency as the case of the combination of the parabolic mirror 104 and the collimating lens 111.

Moreover, in the case of Japanese Laid-Open Patent Application No. 5-264904 like the example shown in FIG. 4, the concave mirror 112 having a spherical center at the first focal point F1 is arranged and light not covered by the surface of the parabolic mirror 104 is reflected and utilized to improve the usability of the luminous flux generated from the light source 105. However, the idea that luminous flux is focused at once and collimated by the collimator lens 107 to decrease the whole size of the integrator optical system 100, thus achievement of the comprehensive object is the same idea as the example in the prior art shown in FIG. 1. Hence, similar to the configuration shown in FIG. 1, the size of an image of the light source at the focal point, at which luminous flux emitted from the light source 105 is focused again, is magnified to several times of the size of an original image of the light source and collimation by a collimator lens is limited so that light usability of the integrator optical system 100 is lowered.

Furthermore, the configuration example shown in FIG. 4 is similar to the case of Japanese Laid-Open Patent Application NO. 3-111806 in that as a coverage angle θ of the ellipsoidal mirror 104 is increased, a maximum incidence angle Ψ is also increased, so that efficiency at the collimator lens is reduced and an illumination apparatus becomes complex because of needing many lenses, etc.

Also, in the case of Japanese Laid-Open Patent Application No.2001-66697 like the example shown in FIG. 5, light reflected from a spherical mirror magnifies an arc image of the light source as if there were a group of arc images at the position away from the same degree of a distance from the vessel center to the mirror as indicated by dashed lines in FIG. 5. In other word, since the arc image is present at a position away from the focal point of the reflector, it is disadvantageous that parallelism of luminous flux from the reflector 211 obtained via the spherical reflection mirror is extremely lowered as compared to light directly coming from the arc. Moreover, at a pipe wall reaching to near 1000° C., reflection property is lowered for a short time period. Even if the lamp is slightly floated from the pipe wall as shown in FIG. 6, degradation time of the lamp may become slightly longer, but the lamp must be frequently exchanged in practice.

SUMMARY OF THE INVENTION

Accordingly, it is a general object of the present invention to provide an illumination apparatus reducing the size of an output light utilizing optical system such as an integrator optical system and improving the usability of luminous flux originating from a light source, and a liquid crystal projector using such an illumination apparatus.

A more specific object of the present invention is to provide an illumination apparatus improving parallelism of luminous flux entering an output light utilizing optical system such as an integrator optical system, for example, capable of reducing the size of an image of a light source on a surface of a second fly-eye lens-array of the integrator optical system to point source-like, and a liquid crystal projector using such an illumination apparatus.

A more specific object of the present invention is to provide an illumination apparatus capable of taking a substantially large coverage angle, making an incidence angle to a collimation means small, and obtaining a collimated light efficiently.

A more specific object of the present invention is to provide an illumination apparatus capable of emitting high-quality homogeneous illuminating radiation onto an illuminated surface.

To achieve one of the above objects, the present invention provides an illumination apparatus in which at least one part of a reflector is a first parabolic mirror, a light source is arranged near a focal point of the first parabolic mirror, and collimated light that is emitted from the light source and reflected from the first parabolic mirror exits toward an output light utilizing optical system, wherein a front mirror with a window having no mirror surface and a transparency, whose size is substantially the same as the size of an entrance part of the output light utilizing optical system, and with a mirror surface at the light source side that is symmetrical about a light axis of the collimated light extending through the position of the focal point of the first parabolic mirror, is arranged on the light path of the collimated light.

Accordingly, while the collimated light reflected from the first parabolic mirror basically exits through the window having no mirror surface of the front mirror toward the output light utilizing optical system, light generated from the light source and not directly impinging on the first parabolic mirror can be reflected from the mirror surface at the light source side that is symmetrical about the light axis of the collimated light extending through the position of the focal point of the first parabolic mirror, returned back to the first parabolic mirror, reflected again by the first parabolic mirror, and exiting as collimated light through the position of the focal point. Hence, the parallelism of the luminous flux exiting toward the output light utilizing optical system is not decreased and most of the luminous flux of the light generated from the light source can be utilized efficiently. Furthermore, since the size of the window having no mirror surface and a transparency, being substantially the same as the size of an entrance part of the output light utilizing optical system, can be controlled, the size of the output light utilizing optical system can be controlled to be small.

The present invention provides the illumination apparatus as described above, wherein the front mirror is provided to a front glass attached to an exit of the first parabolic mirror as one unit.

According to the present invention as described above, the configuration of the illumination apparatus can be made simple and the precision with respect to the orthogonality of the front mirror to the light axis, etc., can be maintained, since the front mirror is provided to the front glass attached to the exit of the first parabolic mirror as one unit.

The present invention provides the illumination apparatus described above, wherein the front mirror is arranged between the front glass attached to an exit of the first parabolic mirror and the light source.

Accordingly, in realization of the invention described above, the whole size of the illumination apparatus can be made more compact. Also, light generated from a light source can be reflected and returned by the front mirror before the light diverges, to control the divergence angle of the light to become smaller.

The present invention provides the illumination apparatus described above, wherein the output light utilizing optical system comprises an integrator optical system therein and the front mirror is provided in combination with a first fly-eye lens-array or a member corresponding to the first fly-eye lens-array of the integrator optical system as one unit.

Accordingly, the configuration of the illumination apparatus can be made simple and the precision with respect to the orthogonality of the front mirror to the light axis, etc. can be maintained, since the front mirror is provided in combination with a first fly-eye lens array or a member corresponding to the first fly-eye lens-array of the integrator optical system as one unit.

The present invention provides the illumination apparatuses described above, wherein the front mirror is a plane mirror.

Accordingly, such configuration where the plane mirror is provided so as to be orthogonal to the light axis of the collimated light is included in the illumination apparatuses described above. Hence, in the realization of the illumination apparatuses, it is easy to fabricate the front mirror since the front mirror is a plane mirror.

Moreover, the present invention provides an illumination apparatus in which at least one part of a reflector is a first parabolic mirror, a light source is arranged near a focal point of the first parabolic mirror, and collimated light emitted from the light source and reflected from the first parabolic mirror exits toward an output light utilizing optical system, wherein the reflector comprises the first parabolic mirror at least in a region in which the collimated light reflected from the first parabolic mirror covers an entrance of the output light utilizing optical system and an ellipsoidal mirror outside the first parabolic mirror having a focal point common to the focal point of the first parabolic mirror, and a plane mirror with a window having no mirror surface and a transparency, whose size is substantially the same size of an entrance part of the output light utilizing optical system, is arranged near a minor axis of the ellipsoidal mirror perpendicularly to the light axis of the collimated light.

Accordingly, similar to the present invention as described above in which the plane mirror is employed as the front mirror, in particular, since the first parabolic mirror and the ellipsoidal mirror are combined as the reflector, attenuation of luminous flux can be suppressed by decreasing the number of reflections repeated between the reflector and the plane mirror to improve usability of the light. In addition, as compared to the case of utilizing only one parabolic mirror, the size of the reflector is made smaller if the parabolic mirrors have the same focal length. As a result, down-sizing of the whole illumination apparatus can be realized without reducing the usability of the light.

The present invention provides the illumination apparatus described above, wherein the reflector comprises a second parabolic mirror existing from an end of the ellipsoidal mirror and extending to the plane mirror near the minor axis and having a focal point common to the focal point of the first parabolic mirror.

Accordingly, in realization of the invention described above, it is easy to make a mold for the reflector so that the surface precision of the reflector can be improved.

The present invention provides the illumination apparatuses described above, wherein the front mirror is a third parabolic mirror having a focal point common to the focal point of the first parabolic mirror.

Accordingly, in realization of the illumination apparatuses according to the present invention as described above, parallelism of collimated light can be improved to create high-quality illumination since the front mirror is a third parabolic mirror facing the first parabolic mirror as the reflector.

The present invention provides the illumination apparatus described above, wherein the position of a point at which a straight line through the focal point and a part of the third parabolic mirror at which the distance from the center of the window is minimum intersects the first parabolic mirror is outside an intersection line of a hole through which the light source is inserted.

Accordingly, even if the hole for inserting and mounting the light source is taken into consideration, most of the luminous flux emitted from the light source can be utilized to provide a more efficient illumination apparatus.

The present invention provides the illumination apparatuses described above, wherein the output light utilizing optical system has a polarization converter for aligning polarization direction on the entrance thereof and the size of the window having no mirror surface of the front mirror is substantially the same as the size of the polarization converter.

Accordingly, in such a configuration where a polarization converter is employed to improve usability of the light, an operation and a working effect similar to those of the present inventions as described above can be obtained. Particularly, by devising a structure of a polarization converter, the size of the window on the front mirror can also be decreased by half.

The present invention provides the illumination apparatuses described above, wherein the output light utilizing optical system has an integrator optical system on the entrance thereof and the size of the window having no mirror surface of the front mirror is substantially the same as the effective size of the first fly-eye lens-array on the entrance of the integrator optical system.

The present invention provides the illumination apparatuses described above, wherein the output light utilizing optical system has an integrator optical system on the entrance thereof and the size of the window having no mirror surface of the front mirror is substantially the same as an effective size of a orthogonal cylindrical lens-array on the entrance of the integrator optical system.

Accordingly, since the density of the luminous flux emitted from the light source is not uniform, in such configuration as an integrator optical system, in which the luminous flux is divided into multiple segments and the respective divided luminous flux segments are integrated on an illuminated object again, is provided, an operation and a working effect similar to those of the present inventions as described above can be obtained.

The present invention provides the illumination apparatuses described above, wherein the window of the front mirror has such size as a minimum distance from the light axis to a part at which the collimated light through the focal point of the first parabolic mirror impinges the front mirror is larger than two times of the focal length of the first parabolic mirror.

Accordingly, light reflected from the front mirror is effectively led to an exit aperture of the reflector to improve usability of the luminous flux emitted from the light source.

The present invention provides the illumination apparatus described above, wherein the front mirror is held at a set position by a spring material.

Accordingly, the front mirror is not fixed by means of adhesive, etc. and the shape of the third parabolic mirror used as the front mirror can be kept constant even in an illumination apparatus with large temperature change, so that a highly efficient illumination apparatus can usually be provided.

The present invention provides an illumination apparatus using an ellipsoidal mirror in at least one part of a reflector, arranging a light source near a first focal point of the ellipsoidal mirror and reflecting luminous flux emitted from the light source by the ellipsoidal mirror to direct the luminous flux to near a second focal point of the ellipsoidal mirror, wherein a front mirror, on which a window having no mirror surface is formed at a part near the light axis extending through the first focal point and the second focal point, is arranged between the first focal point and the second focal point, and at least one part of the light reflected from the ellipsoidal mirror of the luminous flux emitted from the light source is reflected from the front mirror in front of the second focal point to be returned to the ellipsoidal mirror or a vicinity of the first focal point.

Accordingly, while the luminous flux reflected from the ellipsoidal mirror constituting the reflector is basically directed to the second focal point through the window of the front mirror, luminous flux generated from the light source and reflected from the front mirror and a luminous flux generated from the light source, reflected from the ellipsoidal mirror and further reflected from the front mirror can be directed through the first focal point, reflected from the ellipsoidal mirror, passes through the window of the front mirror and directed toward the second focal point side. Hence, a substantially large coverage angle can be taken only by deciding the size of the window of the front mirror so as to utilize almost all of the luminous flux generated from the light source efficiently.

The present invention provides the illumination apparatus described above, wherein the front mirror is a plane mirror arranged orthogonal to the light axis and at the position of the minor axis of the ellipsoidal mirror.

Accordingly, since it is basically easy to make the front mirror, which is a plane mirror, the configuration of the illumination apparatus can be made simply. Hence, the front mirror and a front glass covering an exit of the reflector can be provided as one unit, etc., and precision with respect to the orthogonality of the front mirror to the light axis, etc. can be improved.

The present invention provides the illumination apparatus described above, wherein the front mirror has the window at least in the range cut out by a conical surface extending from an edge of a light source holding hole formed on the reflector through the first focal point.

Accordingly, even if the light source holding hole for mounting the light source is taken into consideration, the coverage angle is taken as large as possible in such range as the luminous flux is not under the influence of an adverse effect by the light source holding hole formed on the reflector, so that almost all of the luminous flux emitted from the light source can be utilized to provide an illumination apparatus with high efficiency.

The present invention provides the illumination apparatus described above, wherein the front mirror is a spherical mirror of whose center is the second focal point.

Accordingly, luminous flux generated from the light source, reflected from the ellipsoidal mirror and directed to the spherical mirror can take such a light path that the luminous flux is reflected toward the ellipsoidal mirror again, passes through the first focal point at which the light source is placed, and is reflected from the ellipsoidal mirror again so that the luminous flux can be efficiently directed toward the second focal point side.

The present invention provides the illumination apparatus described above, wherein the front mirror has a window at least in the range cut out by a conical surface extending from the intersection line of a surface orthogonal to the light axis at the first focal point and the ellipsoidal mirror, to the second focal point.

Accordingly, the coverage angle is taken as large as possible without loss of the usability of the light generated from the light source.

The present invention provides the illumination apparatuses described above, wherein a first optical member of a collimation means for making collimated light is arranged behind the second focal point on the light axis.

Accordingly, an incidence angle into the collimation means such as a collimator lens can be made small to obtain efficiently collimated light.

The present invention provides the illumination apparatuses described above, wherein a first optical member of a collimation means for making collimated light is arranged between the front mirror and the second focal point.

Accordingly, luminous flux directed to the second focal point can be collimated by the collimation means such as a collimator lens so that a rear output light utilizing optical system can be closely arranged.

The present invention provides the illumination apparatuses described above, wherein the window has a shape similar to the shape of an entrance of an optical element on the entrance part of the output light utilizing optical system.

Accordingly, since the window of the front mirror is formed into a shape similar to an entrance of an optical element on the entrance part of the output light utilizing optical system, the size of the output light utilizing optical system can be made small by controlling the size of the window.

The present invention provides the illumination apparatus described above, wherein the optical element on the entrance part of the output light utilizing optical system is an integrator.

Accordingly, since density of the luminous flux emitted from the light source is basically uneven, in such configuration where the integrator optical system is provided to divide the luminous flux into multiple segments and to again integrate respective divided luminous flux segments on an illuminated object again, an operation and a working effect similar to those of the invention described above can be obtained. That is, parallelism of the luminous flux entering the integrator optical system can be improved and the size of the light source image formed on a surface of the second fly-eye lens-array in the integrator optical system can be made small, and thus high-quality homogeneous illuminating radiation can be emitted for illuminating a liquid crystal panel, etc. in a liquid crystal projector.

The present invention provides the illumination apparatus described above, wherein the optical element on the entrance part of the output light utilizing optical system is a polarization converter.

Accordingly, in such configuration where the output light utilizing optical system includes the polarization converter to improve usability of light, an operation and a working effect similar to those of the invention described above can be obtained.

The present invention provides a liquid crystal projector comprising at least one liquid crystal panel on which an image projected by an image information controlling unit is formed, the illumination apparatuses described above for illuminating the liquid crystal panel as an illuminated object by the output light utilizing optical system, and a projection lens system for projecting the image formed on the liquid crystal to a screen.

Accordingly, since the liquid crystal panel can be illuminated by luminous flux with high usability of light on the whole using the illumination apparatus described above to project the image to the screen by the projection lens system having a relatively small aperture, the whole liquid crystal projector can be made compact.

Herein, the liquid crystal panel may be a reflection liquid crystal panel and a transmission liquid crystal panel. Particularly, in the case of the reflection liquid crystal panel, it is most preferable that the incidence angle of the illuminating radiation to the liquid crystal panel should be only vertical. Also, it is practically necessary that the incidence angle should be controlled to be in the range of a few degrees taking a tolerance for decrease of contrast into consideration. That is, efficient illumination can be made for the incidence angle within a few degrees of collimated light with high parallelism like the above. Also, in the case of a color display, three liquid crystal panels corresponding to three primary colors, R, G, and B or red, green, and blue, respectively, are commonly used in combination with a dispersion element, etc., for example, a dichroic prism or mirror.

BRIEF DESCRIPTION OF THE DRAWINGS

Other objects, features and advantages of the present invention will become more apparent from the following detailed description when read in conjunction with the accompanying drawings, in which:

FIG. 14 is a schematic diagram showing an optical configuration of a practical example to which an illumination apparatus according to the present invention is applied.

FIG. 15 is a schematic diagram showing a main part of an illumination apparatus according to the sixth embodiment of the present invention, wherein (a) is a cross-sectional diagram showing a configuration near a reflector.

DETAILED DESCRIPTION OF THE PREFERRED EMBODIMENTS

Figure 1:
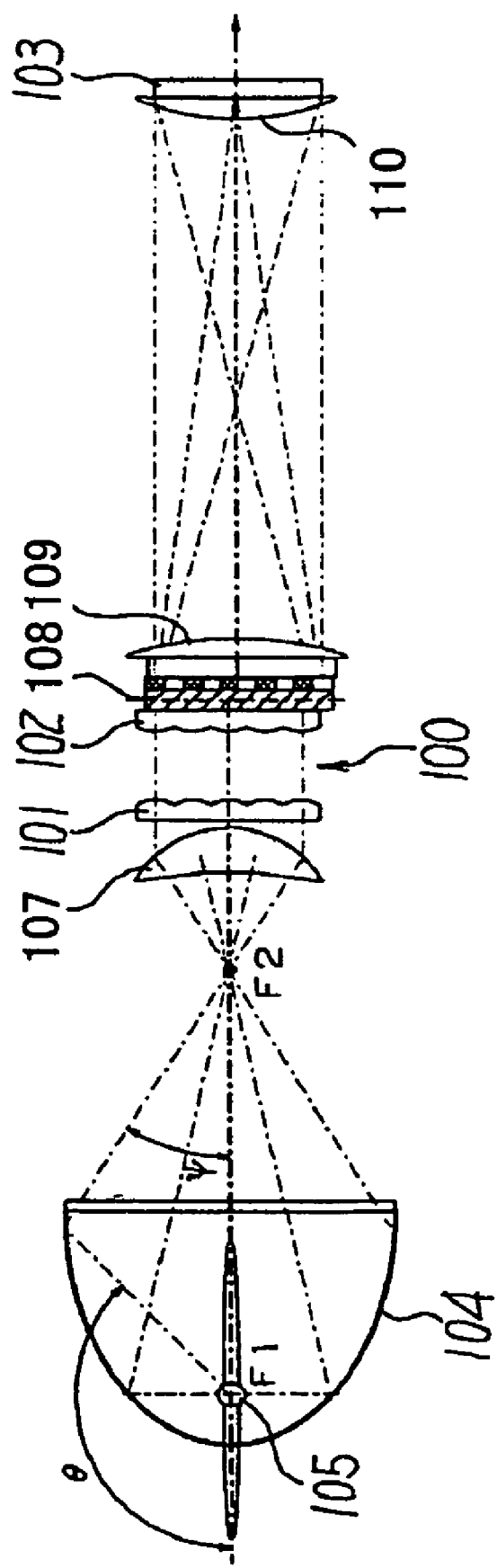
FIG. 1 is a schematic diagram showing an optical configuration of a first illumination apparatus in the prior art.
Figure 2:
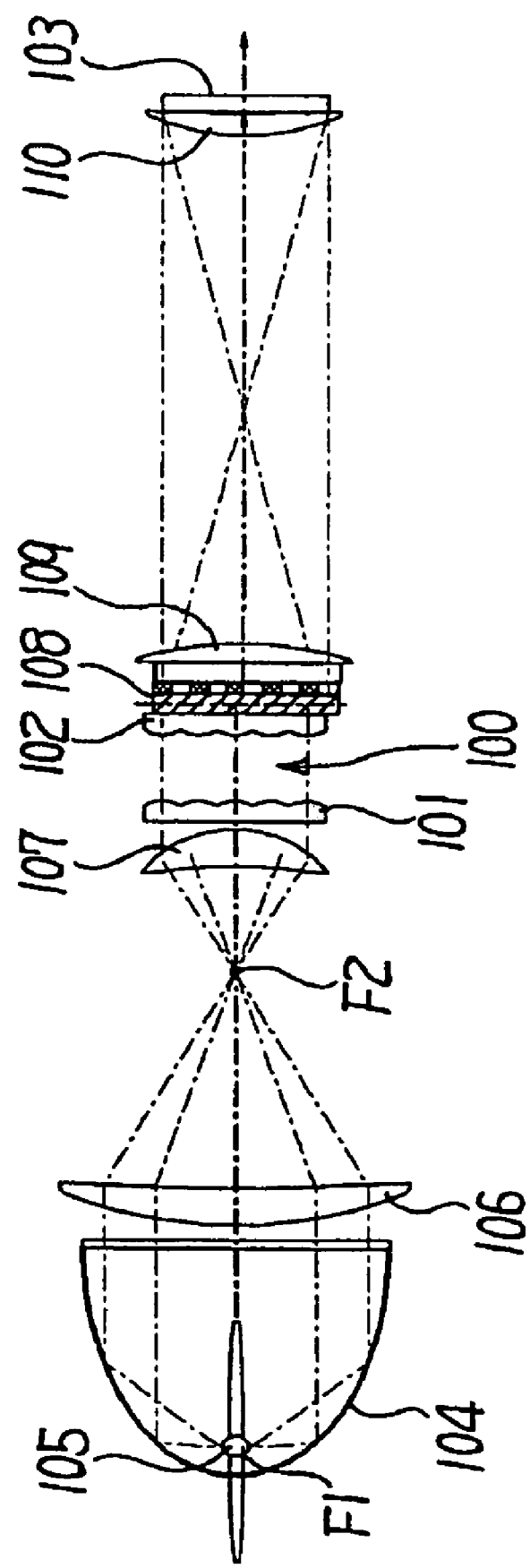
FIG. 2 is a schematic diagram showing an optical configuration of a second illumination apparatus in the prior art.
Figure 3:
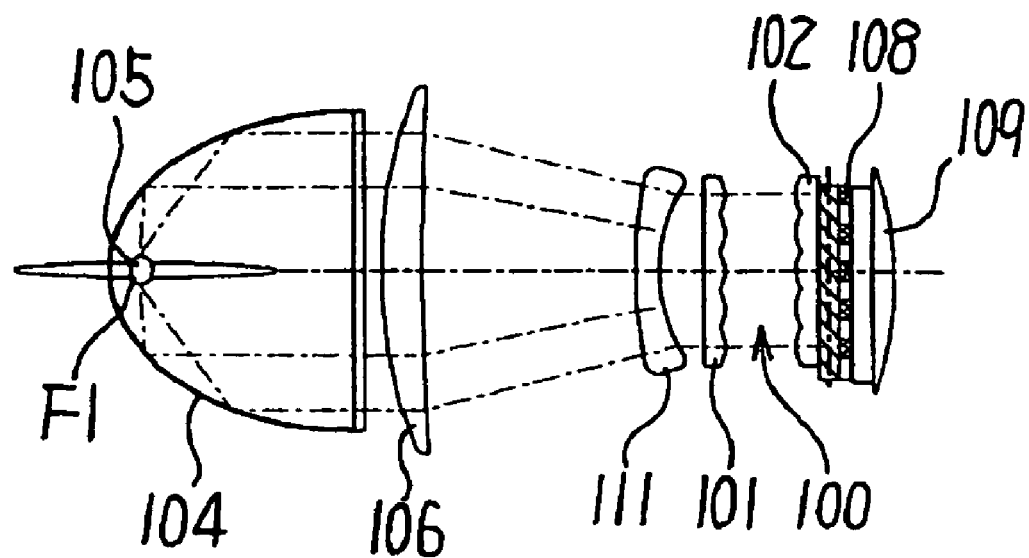
FIG. 3 is a schematic diagram showing an optical configuration near a reflector of a third illumination apparatus in the prior art.
Figure 4:
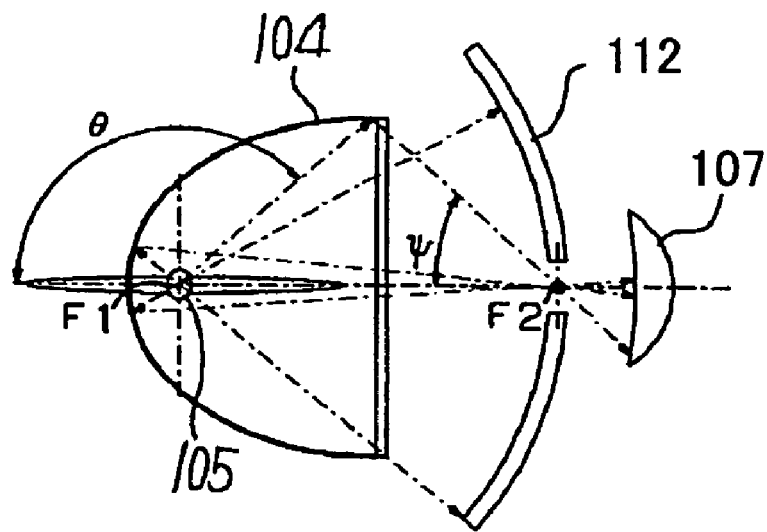
FIG. 4 is a schematic diagram showing an optical configuration near a reflector of a forth illumination apparatus in the prior art.
Figure 5:
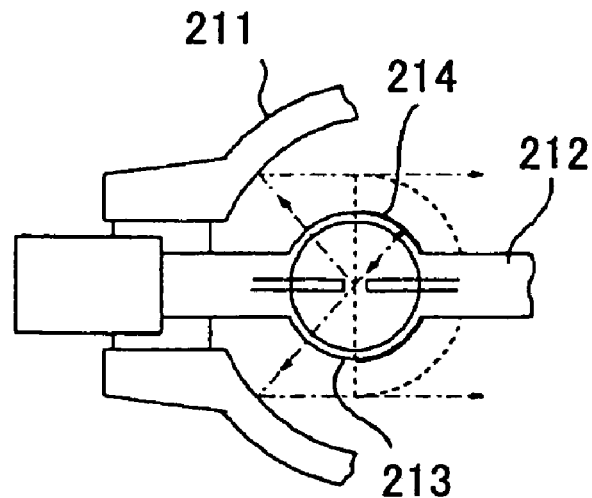
FIG. 5 is a schematic diagram showing an optical configuration near a reflector of a fifth illumination apparatus in the prior art.
Figure 6:
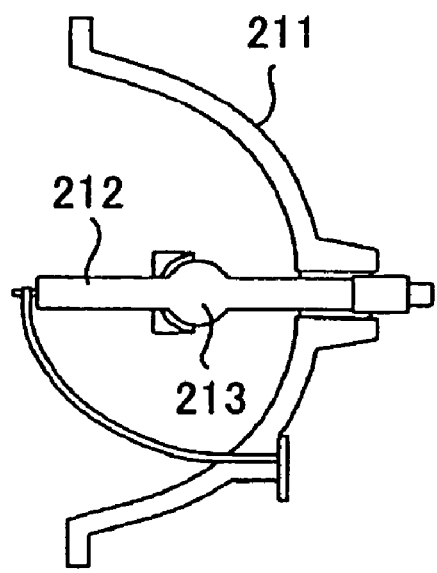
FIG. 6 is a schematic diagram showing an optical configuration of a variation of the reflector shown in FIG. 5.

Firstly, the first embodiment of the present invention will be illustrated with reference to FIG. 7.

In an illumination apparatus A1 of the present embodiment, a rectangular liquid crystal panel 1 with an aspect ratio of a longitudinal side and a lateral side of 4:3 is an illuminated object and a condenser lens 2 laid on the front surface of the crystal panel transmits luminous flux with minimum diameter to a projection lens after respective liquid crystal elements receive illuminating radiation and form an image. For such liquid crystal panel 1, the illumination apparatus A1 of the present embodiment includes a light source 3 like a point source, a parabolic mirror 4 as a reflector in which the light source 3 is arranged inside, an integrator optical system 5 as an output light utilizing optical system, and a focusing lens 6.

As for the light source 3, a high-pressure mercury-vapor lamp, a metal halide lamp, and a xenon lamp, etc. have been used. The light source 3 is arranged at a focal point F of the parabolic mirror 4 with an inside mirror surface 4a in the shape of a revolved parabola. Hence, the mirror surface 4a of the parabolic mirror 4 has an optical property of emission of collimated light when the mirror surface 4a receives light originating from the light source 3. The exit of the parabolic mirror 4 is covered with a front glass 8.

An integrator optical system 5 is a well known one, for example, from the above mentioned Japanese Laid-Open Patent Application No. 3-111806, and has basically a configuration of the combination of a first fly-eye lens-array 9 and a second fly-eye lens-array 10. In the present invention, particularly, the second fly-eye lens-array 10 is replaced with two cylindrical lens-arrays 10a and 10b in a mutually orthogonal arrangement. In the present embodiment, a polarization alignment prism array 11 of the combination of a PBS or polarization beam splitter array and a ½ wave plate is provided between the cylindrical lens-arrays 10a and 10b in order to align polarization of light. The focusing lens 6 arranged behind the cylindrical lens array 10b serves to make a convolution of segmented luminous flux, which segments are formed due to division by the fly-eye lens-arrays, on the liquid crystal panel 1.

In addition to the basic configuration of such illumination apparatus A1, a plane mirror 12 as a front mirror is attached on the inner-side surface of the front glass 8 orthogonal to the light axis of the collimated light as one unit in the present embodiment. That is, the plane mirror 12 is arranged orthogonal to the light axis of the collimated light. Seen from another standpoint, a reflection surface symmetrical to the light axis of the collimated light through the focal point F of the parabolic mirror 4 is formed to be orthogonal to the light axis and placed at the light source 3 side of the front glass 8. The plane mirror 12 is a mirror formed on a part of the inner-side surface of the front glass 8. A window 13 having no mirror structure, whose size is substantially the same as the size of the first fly-eye lens-array 9 as an entrance of the integrator optical system 5, is formed on the center part of the plane mirror 12. That is, the window 13 is transparent for light originating from the light source 3. An AR coat 14 for the window 13 is applied on the both surfaces of the front glass 8 in order to improve the transparency of light.

Accordingly, in the illumination apparatus A1 in the first embodiment according to the present invention, the collimator lens 107, the convex lens 106 and the convex lens 111 in the prior art example, to make the size of the integrator optical system 5 compact, are all omitted and the collimated light reflected from the parabolic mirror 4 or the reflector directly enters the integrator optical system 5. However, since the luminous flux generated from the light source 3 cannot all be utilized by the above configuration, the luminous flux not directly entering the integrator optical system 5 is reflected back toward the parabolic mirror 4 again by the plane mirror 12 being orthogonal to the light axis of the collimated light. The reflected luminous flux is returned to the focal point F that is the position of the light source 3, by the parabolic mirror 4. Herein, in the present embodiment, since an arc lamp such as a high-pressure mercury-vapor lamp, a metal halide lamp and a xenon lamp, etc. is used as the light source 3, the returned luminous flux passes between electrodes of the light source 3, reaches to the mirror surface 4a of the parabolic surface 4 again, is reflected by the mirror surface 4a at once, becomes collimated light, and is directed to the integrator optical system 5 from the window 13. In fact, the image formed here is an image of the light source being several times larger than the image of the light source at the time of original emission so that a part of the luminous flux is blocked by the electrodes.

According to the present embodiment, while the collimated light reflected from the parabolic mirror 4 basically exits through the window 13 having no mirror surface of the plane mirror 12 toward the integrator optical system 5, light generated from the light source 3 that does not directly reflect from the parabolic mirror 4 through the window 13 can be reflected from the plane mirror 12 orthogonal to the light axis of the collimated light, returned to and reflected a second time on the parabolic mirror 4, and pass through the position of the focal point F, be reflected a third time on the parabolic mirror 4, and exit as collimated light through the window 13. Hence, the parallelism of the luminous flux exiting toward the output light utilizing optical system 5 is not decreased and most of the luminous flux of the light generated from the light source can be utilized efficiently. Furthermore, since the size of the window 13 having no mirror surface and a transparency and being substantially the same size of the first fly-eye lens-array 9 placed on an entrance of the integrator optical system 5, can be controlled, the size of the integrator optical system 5 can be controlled to be small and usability of the luminous flux from the light source 3 is maintained almost independent on the shape of the integrator optical system 5. Also, providing the plane mirror 12 attached to the front glass 8 at the exit of the parabolic mirror 4 as one unit, precision with respect to orthogonality of the plane mirror to the light axis, etc., can be maintained and the configuration of the illumination system is made simple.

The second embodiment according to the present invention will be illustrated with reference to FIG. 8. The same part as the part illustrated in the first embodiment is indicated with the same numerals and the explanation about that part will be omitted. The same will be applied for each of the following embodiments.

Although the plane mirror 12 is directly formed as one unit on the inner surface of the front glass 8 in the first embodiment, the plane mirror 15 as a front mirror that is a member different from the front glass 8 is provided on the inner surface or the outer surface of the front glass 8, perpendicularly to the light axis of the collimated light for the illumination apparatus A1 in the present embodiment. The plane mirror 15 is, for example, a high-purity aluminum plate whose surface at light source side is mirror-finished. Also, a window 16 of which the shape is substantially the same as the shape of the first fly-eye lens-array 9 is formed as an aperture in the center part of the front glass 8.

Also in such configuration, it is clear that an effect similar to the effect in the case of the first embodiment can be obtained.

Herein, in the illumination apparatus A2 in the present embodiment, a convex lens 17 is provided at almost midpoint between the cylindrical lens 10b and the liquid crystal panel 1 instead of the focusing lens 6. The convex lens 17 also serves to make a convolution of the luminous flux segments formed due to division by the integrator optical system 5 on the liquid crystal panel 1, similar to the case of the focusing lens 6. Particularly, since luminous flux segments formed by respective constituent lenses of the fly-eye lens-arrays 9 and 10 are collimated between the convex lens 17 and the liquid crystal panel 1 in the present embodiment, generation of unevenness of color can be suppressed in the case of a liquid crystal projector using a reflection liquid crystal panel as described later.

Figure 9:
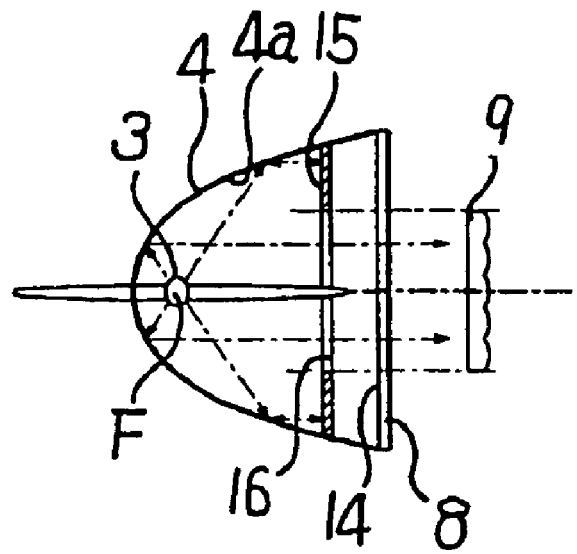
FIG. 9 is a cross-sectional diagram of a configuration near a reflector showing a main part of an illumination apparatus according to the third embodiment of the present invention.
Figure 10:
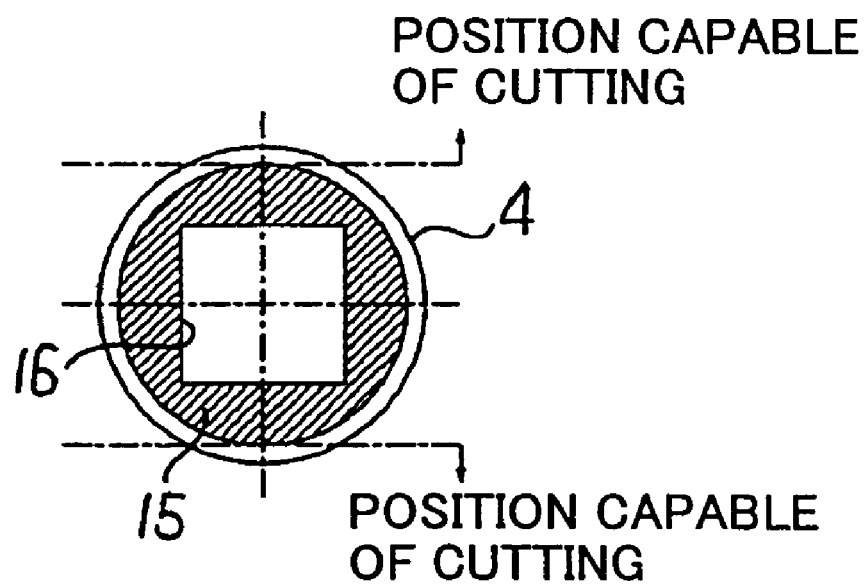
FIG. 10 is an elevation view of the reflector shown in FIG. 9.

The third embodiment according to the present invention will be illustrated with reference to FIG. 9 and FIG. 10. In the present embodiment, only the configuration near the parabolic mirror 4 is shown. In the present embodiment, a plane mirror 15 that is a member different from the front glass 8 is arranged between the front glass 8 and the light source 3. That is, the plane mirror 15 is separated from the front glass 8 and arranged at the light-source 3 side of the front mirror 8. The size and shape of the window 16 are the same as the size and shape of the window shown in FIG. 8.

In such configuration, although luminous flux emitted from the light source 3 is substantially collimated by the parabolic mirror 4, luminous flux with divergence angles of 5° through 10° are generally included. Herein, according to the configuration like the present embodiment, before the divergence of light emitted from the light source 3 is increased, the light is reflected from the plane mirror 15 to hold an image of the light source formed at the focal point F due to the reflected light smaller as compared to the case of FIG. 8. Accordingly, since the divergence angle after reflection on the parabolic mirror 4 and collimation can be held smaller, a drop of the efficiency at the integrator optical system 5 is suppressed. Also in the configuration of the present embodiment, as indicated by the dashed lines that mean positions capable of cutting in FIG. 10, a part of the parabolic mirror 4 outside the plane mirror 15 can be cut out and the cylinder for a projector is made thinner as described later. The same process can be carried out for the left and the right directions as well as the up and the down directions. Also, the parts outside the plane mirror 15 for the up, the down, the left and the right directions are not cut out but the parts outside the plane mirror 15 may be in a shape of a box so that the cylinder can be similarly made thinner.

Figure 11:
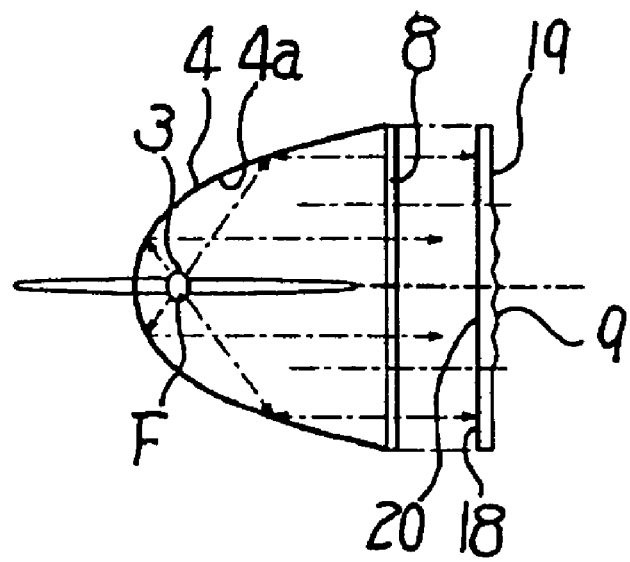
FIG. 11 is a cross-sectional diagram of a configuration near a reflector showing a main part of an illumination apparatus according to the fourth embodiment of the present invention.
Figure 12:
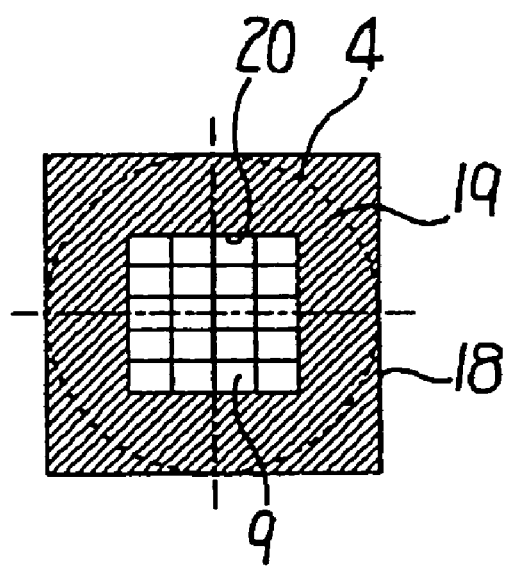
FIG. 12 is an elevation view of the reflector shown in FIG. 11.

The forth embodiment according to the present invention will be illustrated with reference to FIG. 11 and FIG. 12. In the present embodiment, a plane mirror 18 as the front mirror is provided to the first fly-eye lens-array 9 placed at the entrance part of the integrator optical system 5 as one unit. More specifically, a substrate 19 made from the same material as the material of the first fly-eye lens-array 9 is formed to have such size as an aperture of the parabolic mirror 4 can be covered, a lens part of the first fly-eye lens-array 9 is formed into a window 20 and a surrounding area of the window 20 is made to be a mirror surface.

According to the present embodiment, the plane mirror 18 can be simply provided to decrease an adjustment part so that the cost can be decreased. In the case of such configuration as a glass member such as UV cut glass and IR cut glass is placed between the integrator optical system 5 and the parabolic mirror 4, when a part of the glass member outside the part through which luminous flux transmitting the first fly-eye lens-array also passes is made to be a plane mirror, a similar effect can also be obtained.

The fifth embodiment according to the present invention will be illustrated with reference to FIG. 13 and FIG. 14. In the present invention, the structure of a reflector itself is devised to be a combination structure of a parabolic mirror and an ellipsoidal mirror for further improving usability of light.

At first, a principle with respect to the present embodiment will be illustrated with reference to FIG. 13. Herein, the horizontal axis is the Z-axis and the vertical axis is the Y-axis. As the focal point of a parabola is an original point, the formula of the parabola may be represented by $y^2=4f(z+f)$, wherein f is the focal length of the parabola. Furthermore, as a first focal point of an ellipsoid is set at the original point, the formula of the ellipsoid may be represented by $y^2=-b^2(z-c)^2/a^2+b^2$, wherein a is the half length of the major axis of the ellipsoid and b is the half length of the minor axis of the ellipsoid. Also, there is a relationship of $c=\sqrt{(a^2-b^2)}$ indicating a half of the distance between the first focal point and the second focal point. As the parabola and the ellipsoid are drawn so that the condition of $f<a-c$ is satisfied, two curves have two intersection points. As the intersection points are represented by l and l', the coordinates of the intersection points are $(y_1, z_1)$ and $(y_{1'}, z_{1'})$, wherein $z_1=z_{1'}$.

Then, as a coordinate on the Z-axis with respect to a point on the reflection surface of the reflector is represented by $z_r$, a configuration where both the parabola employed in the range of $z_r<z_1$ and the ellipsoid employed in the range of $z_r \geq z_1$ are revolved around the Z-axis is employed. The ellipsoid is extended to the intersection point with the minor axis and a plane mirror is placed at the position of the minor axis. Furthermore, a window around the Z-axis is provided on the plane mirror. As a straight line "line 9" or "line 9'" through the second focal point and the intersection point l or l' intersects the minor axis of the ellipsoid at the point m or m', the size of the window is defined as the range of m through m'. As described later, a circular window with a diameter of segment m m' gives best efficiency.

Next, a principle for efficiently obtaining collimated light from emission of the light source set at the first focal point using such a configured reflector will be illustrated. If a point source is placed at the first focal point, 1. Since a light ray emitted along line 1 is reflected from the surface of the parabolic mirror to be parallel to the Z-axis and vertically impinges on the plane mirror as a light ray along line 2, light reflected from the surface of the plane mirror is returned along line 2, is reflected from the surface of the parabolic mirror again, passes through the first focal point along line 1 to make a convolution with light directly generated from the first focal point, reaches the surface on the parabolic mirror again, is reflected from the surface of the parabolic mirror, and exits out as a light ray along line 3 parallel to the Z-axis.

2. A light ray emitted along line 4 is reflected from the surface of the ellipsoidal mirror and impinges on the plane mirror as light ray directing toward the second focal point along line 5. Since the plane mirror is placed at the position of the minor axis of the ellipsoid in order to be orthogonal to the Z-axis, the light ray incident along line 5 is reflected from the surface of the plane mirror along line 6 directly toward the first focal point. The light ray also makes a convolution with light directly generated from the first focal point, reaches the surface on the parabolic mirror, is reflected from the surface of the parabolic mirror, and exits out as a light ray along line 7 parallel to the Z-axis.

3. Light ray emitted along line 6 directly impinges on the plane mirror. Since the plane mirror is placed at the position of the minor axis of the ellipsoid in order to be orthogonal to the Z-axis, the light ray is reflected from the surface of the plane mirror as a light ray along line 5 directly away from the second focal point to the surface of the ellipsoidal mirror and reflected from the surface of the ellipsoidal mirror again along line 4 directly to the first focal point. The light ray also makes a convolution with light directly generated from the first focal point, reaches the surface on the parabolic mirror, is reflected from the surface of the parabolic mirror and exits out as a light ray along line 8 parallel to the Z-axis.

Figure 13:
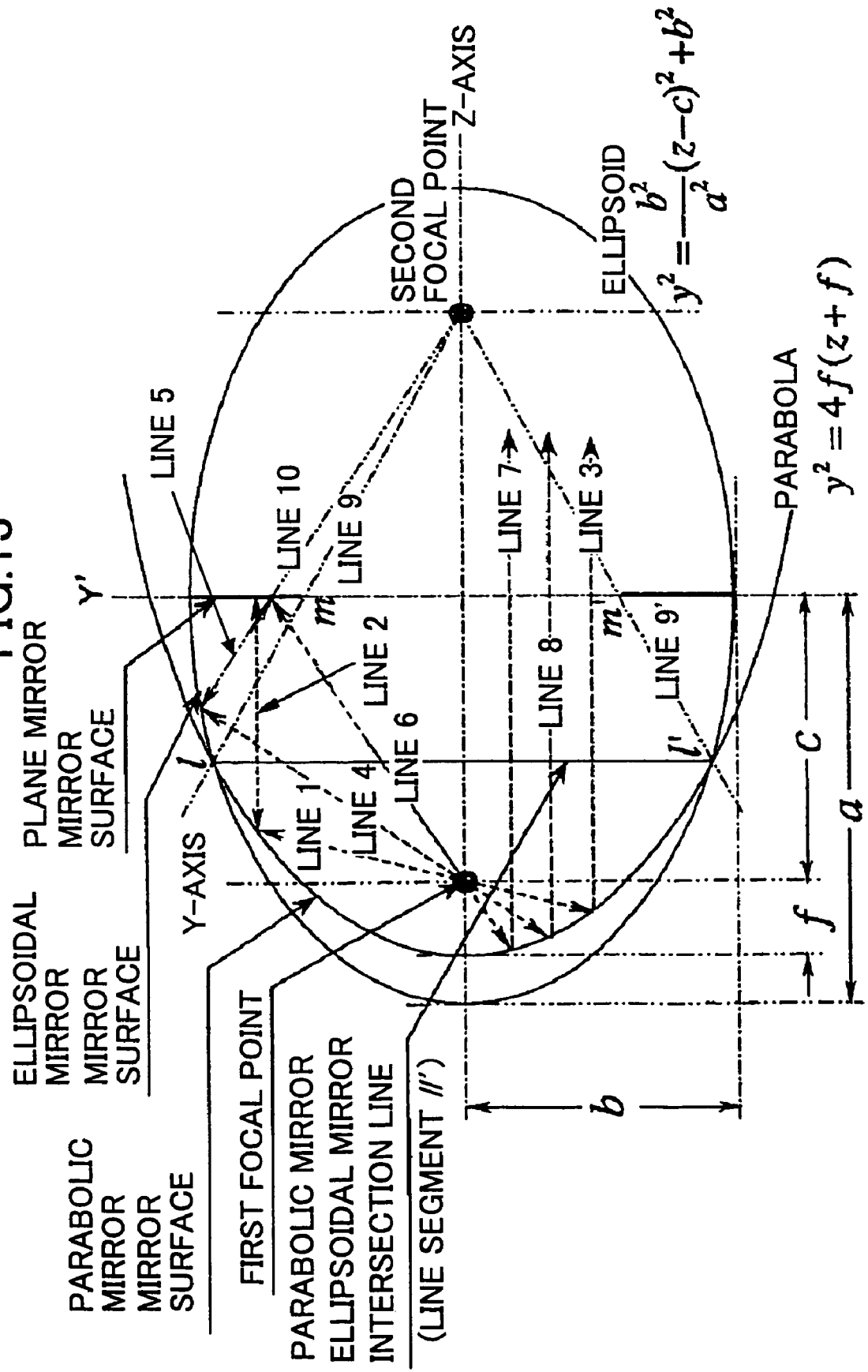
FIG. 13 is a schematic diagram illustrating a principle of a reflector according to the fifth embodiment of the present invention.

FIG. 14 shows a practical configuration example A3 of an illumination apparatus based on the principle of the diagram shown in FIG. 13.

A reflector 21 is configured by the combination of a parabolic mirror 22 and an ellipsoidal mirror 23, and line 24 indicates an intersection line of the parabolic mirror 22 and the ellipsoidal mirror 23. A light source 25 is set at a focal point F of the parabolic mirror 22 that is a first focal point of the ellipsoidal mirror 23. An exit of the reflector 21 is set at the position of the minor axis of the ellipsoid and covered with a front glass 26. A plane mirror 27 as the front mirror is provided on the inner surface of the front glass 26 as one unit. On the center part of the plane mirror 27, a rectangular window 28 is formed, whose size is substantially the same as the size of the first fly-eye lens-array 9 in the integrator optical system 5.

Herein, with respect to a relationships among the intersection line 24 of the parabolic mirror 22 and the ellipsoidal mirror 23, the edge of the window 28 on the plane mirror 27, and the second focal point of the ellipsoidal mirror 23, when an intersection point of line 9 or line 9' through each end point of the intersection line 24 segment and the second focal point of the ellipsoidal mirror 23 and the plane mirror 27 is set to be outside the edge of the window 28 on the plane mirror 27, usability of light becomes best for any position of the intersection point on the plane mirror 27. That is, all light rays reflected from the ellipsoidal mirror 23 can be returned to the light-source 3 at the first focal point.

Also, when light reflected from the parabolic mirror 22 is returned by the plane mirror 27 even a little, it is effective for the distance from the Z-axis to the top of the window 28 to exceed at least 2f. That is, luminous flux emitted along a vertical plane just at Z=0 of the luminous flux emitted from the light source 3 becomes parallel to the Z-axis by reflecting on the parabolic mirror 22, is reflected from the plane mirror 27 to return through the same optical path, is reflected from the parabolic mirror 22, passes through the point at Z=0, is reflected from the counter side of the parabolic mirror 22 to become collimated light. Since the luminous flux is reflected from the plane mirror 27 to return through the same optical path, the luminous flux is damped without exiting out of the illumination apparatus. However, even if the luminous flux emitted along the vertical plane is sacrificed, the illumination apparatus of the present embodiment has higher efficiency than the prior art.

Thus, according to the present embodiment, as compared to the aforementioned first through third embodiment, since light rays reflected from the surface of an ellipsoidal mirror 23 exit with reflections one time fewer than light rays reflected from the surface of a parabolic mirror 22 to be damped a little and light rays directly radiating from the first focal point to the plane mirror 27 can exit outwards as collimated light to be effectively utilized, more efficient illumination is performed.

Although previous embodiments are illustrated under the assumption of a nearly ideal lamp as the light source 3, a practically used lamp comprises electrodes and a glass sphere sealing a gas, for which it is often preferred that the plane mirror 27 is slightly displaced on the Z-axis rather than accurately positioned at the minor axis because of unevenness of the thickness of the glass sphere and deviation of the position of the arc. Particularly, in a kind of DC driven lamp, shapes of electrodes may be asymmetric and one of the electrodes may be larger than the other electrode. Thus, when a larger electrode is placed at the smaller coordinate on the z-axis or to the left side in FIG. 14, in order to decrease returned light blocked by the electrode, it is preferable that the position of an image of the second focal point be slightly displaced to a larger coordinate on the z-axis or to the right side in FIG. 14. It can be achieved by displacing the plane mirror 27 to larger side on z-axis than at the position of the minor axis or right side in FIG. 14. For the above operation, when members of the illumination apparatus are practically assembled, output flux of the illumination apparatus according to the present invention is measured and the member of the plane mirror 27 is fixed at the position at which the value of the output flux is maximum.

Figure 16:
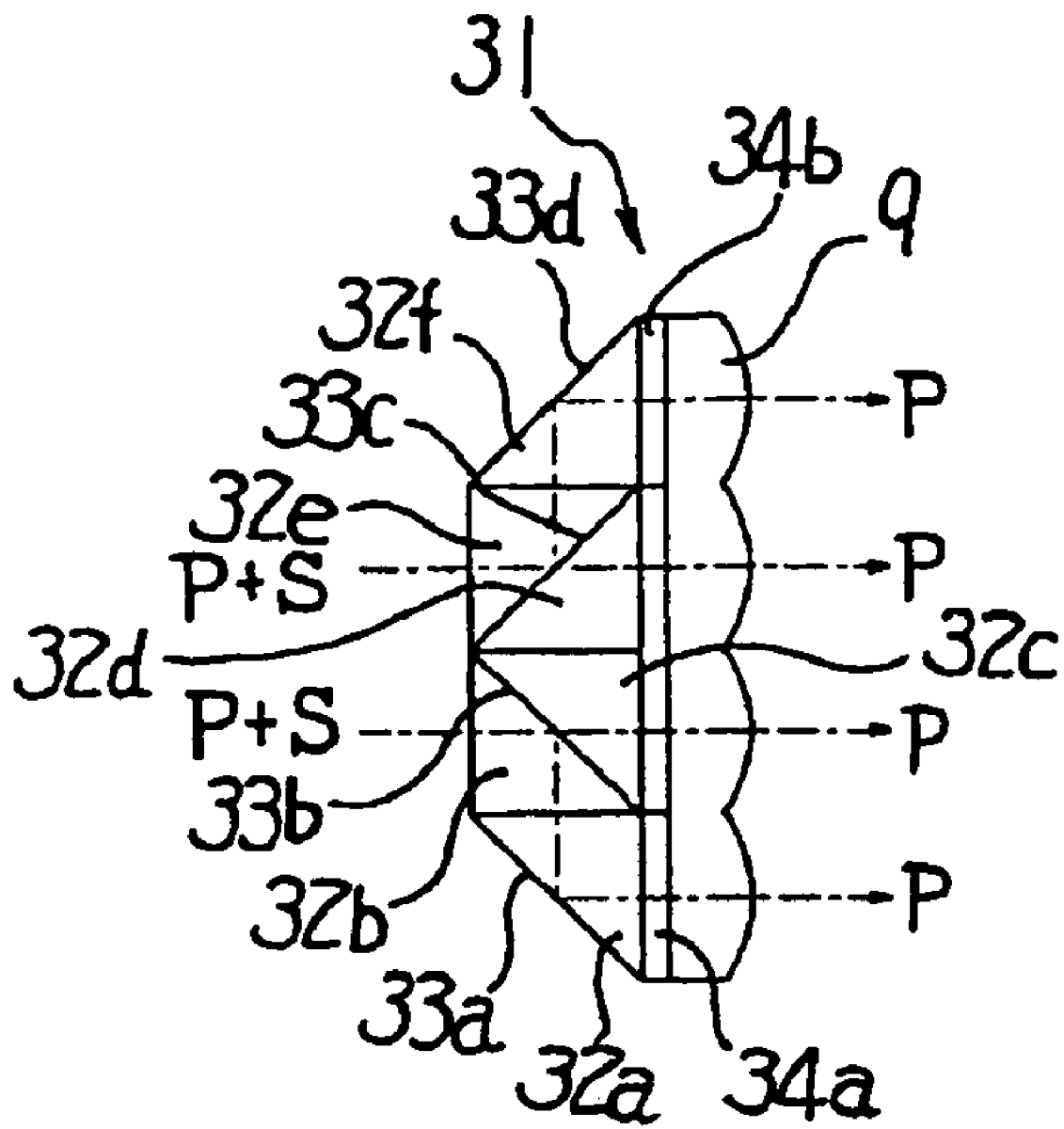
FIG. 16 is a top plan view of a polarization converter.
Figure 17:
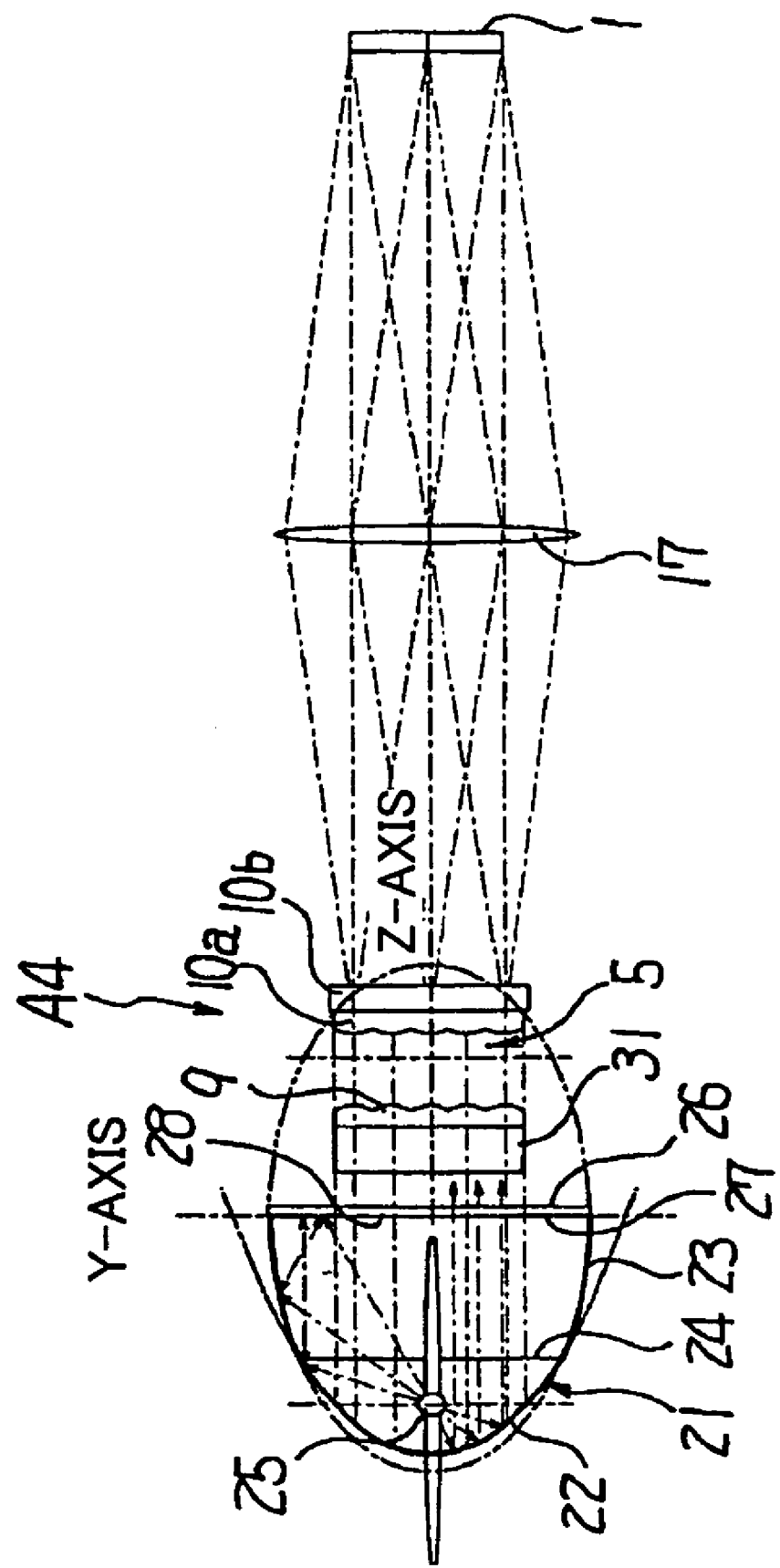
FIG. 17 is a schematic diagram showing an optical configuration of an entire illumination apparatus.

The sixth embodiment according to the present invention will be illustrated with reference to FIG. 15 through FIG. 17. In an illumination apparatus A4 of the present embodiment, a polarization converter 31 at the entrance part of the integrator optical system 5 constituting an output light utilizing optical system is employed and a reflector 21 similar to the case of the aforementioned fifth embodiment is used. Herein, although the optical element 31 is called a polarization converter, the purpose and the function of the polarization converter are the same as those of the aforementioned polarization alignment prism array. However, since the shape of the polarization converter is slightly different in terms of the relative position to the integrator optical system 5, another name is used. The polarization converter 31 is provided to the first fly-eye lens-array 9 as one unit, as shown in FIG. 16. The polarization converter is configured by combining six isosceles triangle-shaped prisms 32a through 32f into a centrosymmetric trapezoidal shape to form PBS or polarization beam splitter films 33a through 33d on each slope of the prism. Since the PBS films 33a through 33d are formed to reflect S-polarization light and transmit P-polarization light, incident collimated light from a reflector 21 side is divided into S-polarization light and P-polarization light by first PBS films 33b and 33c located at the center part of the prism. The P-polarization light is transmitted by the polarization converter and is led to the integrator optical system 5. On the other hand, the S-polarization light is reflected, reflected again by the outer PBS films 33a and 33d, which may be total reflection mirrors alternatively, converted to P-polarization light by ½ wave plates 34a and 34b set on the exits of the prisms 32a and 32f, and led to the integrator optical system 5.

Although the function of the polarization converter 31 could be achieved by a combination of three prisms, as the polarization converter is configured by using six prisms 32a through 32f and symmetrically combining two sets of three prisms in the present embodiment, compact configuration can be made so that the surface area on the emission-side or integrator optical system 5 side of the polarization converter 31 is twice the surface area on the light-receiving side or reflector 21 side. That is, as the shape of the input part of the integrator optical system 5 is the same as that of the case shown in FIG. 14, the surface area on the light-receiving side of the polarization converter 31 may be half so that the size of aperture of the window 28 on the plain mirror 27 can be also decreased to match total size of both prisms 32b and 32e as shown in FIG. 15(b).

Figure 7:
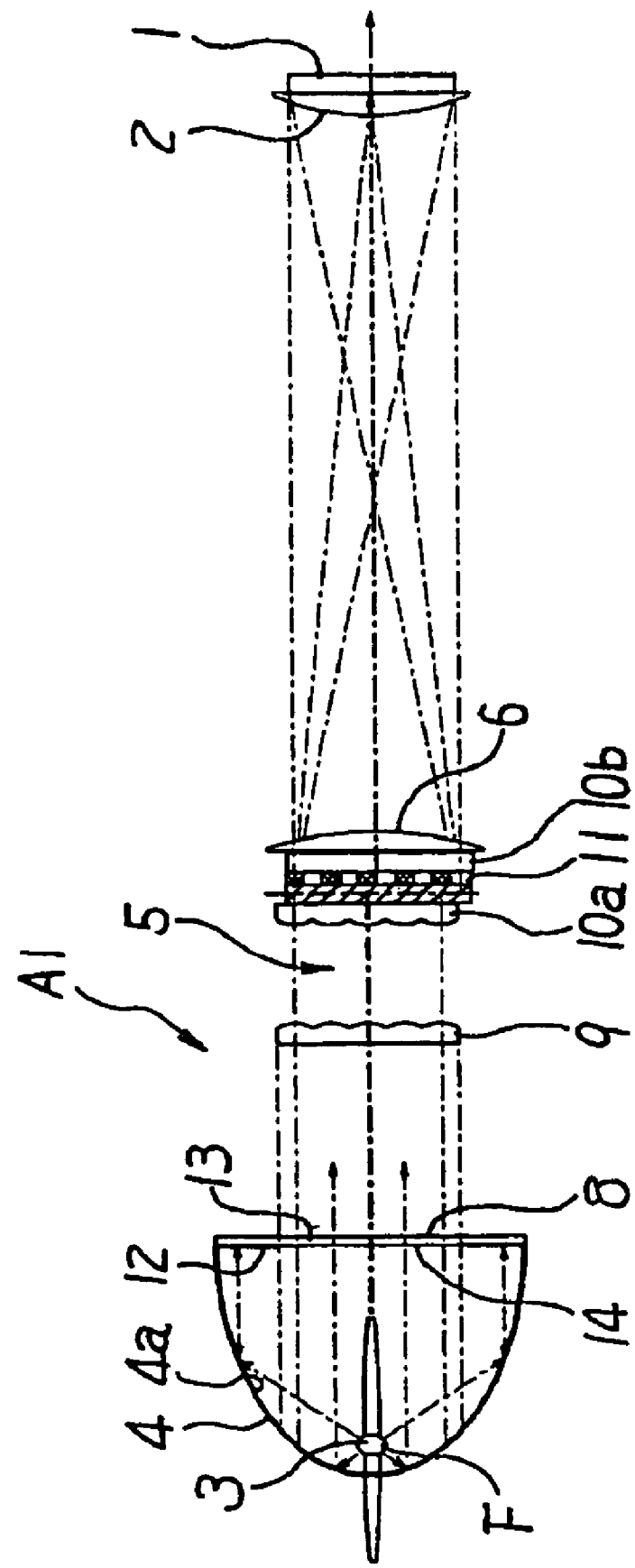
FIG. 7 is a schematic diagram showing an optical configuration of an illumination apparatus according to the first embodiment of the present invention.
Figure 8:
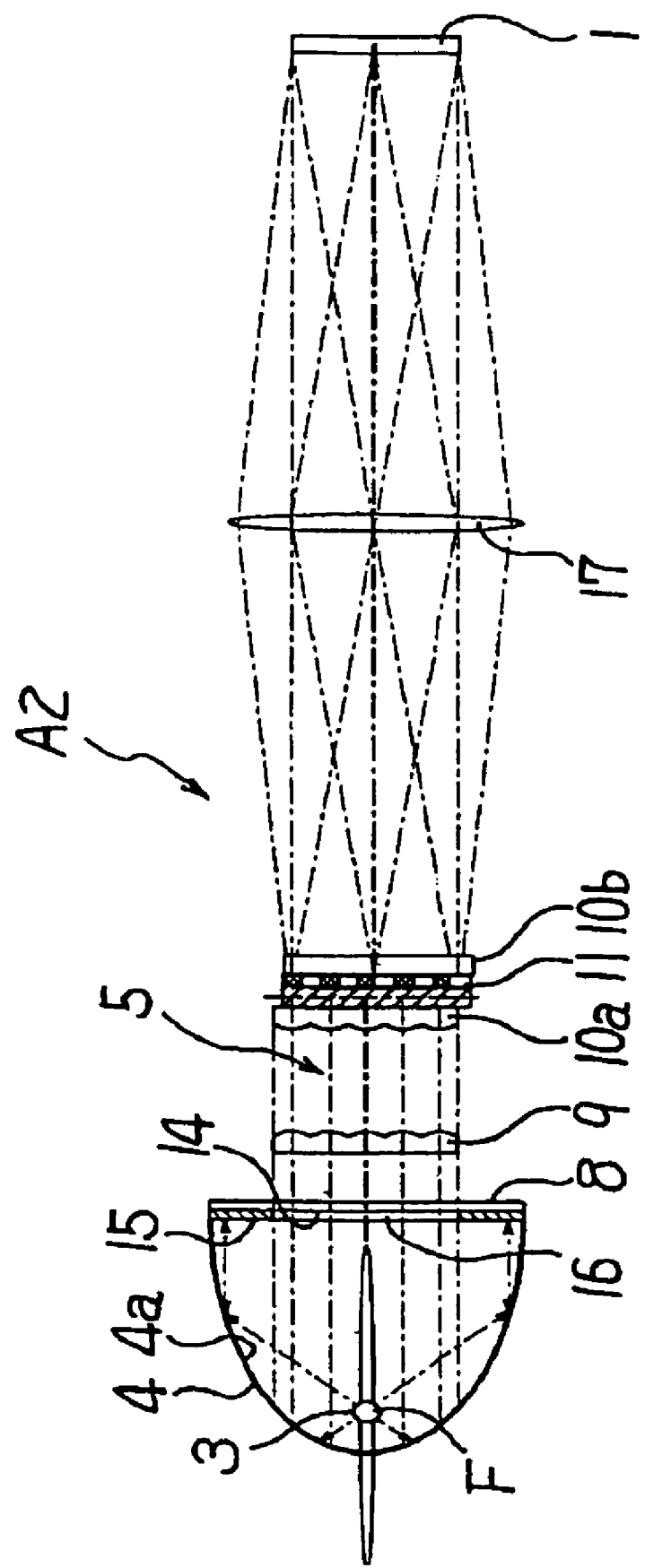
FIG. 8 is a schematic diagram showing an optical configuration of an illumination apparatus according to the second embodiment of the present invention.
Figure 18:
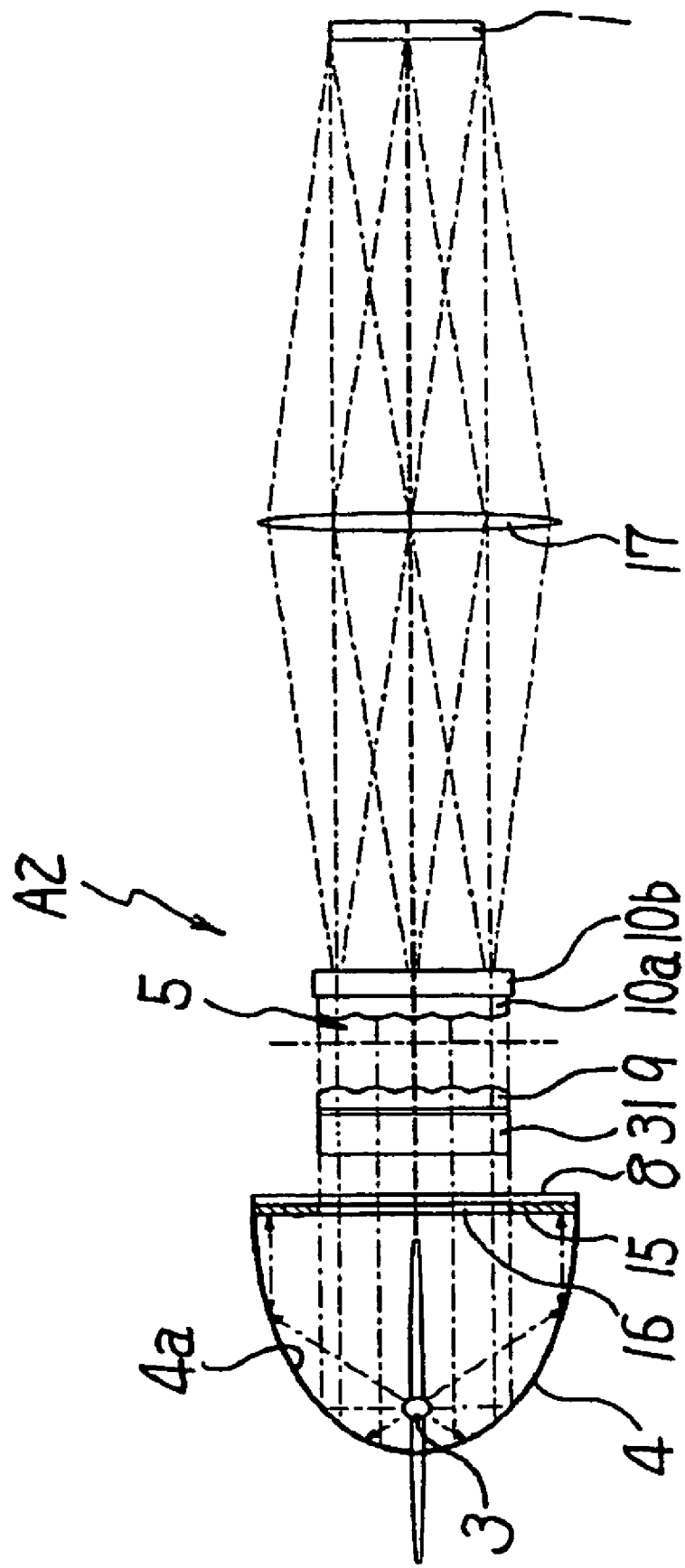
FIG. 18 is a schematic diagram showing an optical configuration of a variation of an illumination apparatus according to the present invention.

Herein, the polarization converter 31 of the present embodiment is applicable in the case of using the parabolic mirror 4 shown in FIG. 7 and FIG. 8, etc. FIG. 18 shows an application example. Thus, the size and the shape of the window 16 on the plain mirror 15 can be decreased to the size and the shape of the light receiving part of the polarization converter 31.

Figure 19:
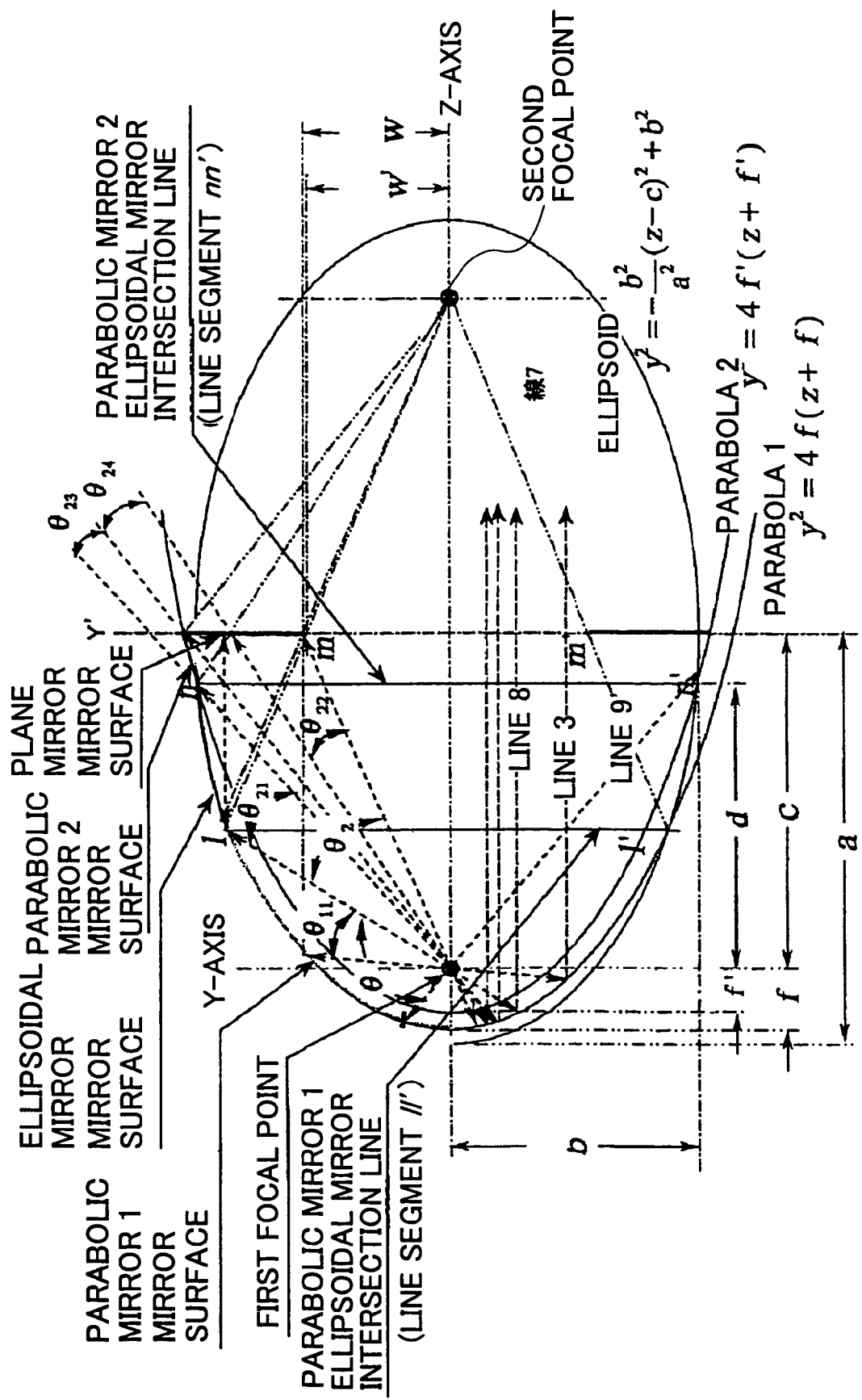
FIG. 19 is a schematic diagram illustrating a principle of a reflector according to the seventh embodiment of the present invention.

The seventh embodiment according to the present invention will be illustrated with reference to FIG. 19. The present embodiment is improved by taking the fabrication process of the reflector 21 into consideration on the condition that the reflector 21 having the structure of a combination of a parabolic mirror and an ellipsoidal mirror is employed in order to further improve the usability of light as compared to the aforementioned fifth embodiment.

In general, after such kind of reflector is formed by molding molten glass in a mold (as at least a positive die also called an arrows-die and a negative die are needed) and a mirror surface is polished, a reflection surface is formed by means of vapor deposition. Accordingly, as an aperture is made at the minor axis of the ellipsoidal mirror surface, a tangent of the aperture is parallel to the light axis so that it is necessary to make a die in complex shape such as a dividing die for removing the arrows-die. If a taper is made in-depth against the aperture, a glass reflector can be formed without making the arrows-die to be complex. However, as the die is simply formed in this way, luminous flux with angle $\theta_{23}$ and $\theta_{24}$ shown in FIG. 19 in radiation from the light source 3 cannot be effectively used.

As for the solution for the problem, in the present embodiment, this reflector is made to include a second parabolic mirror so as to enable to the use of the above indicated portion of the radiation effectively. That is, the position of the focal point of the second parabolic mirror with a focal length f' shorter than the focal length f of the first parabolic mirror 22 is common to the position of the focal point of the first parabolic mirror, the second parabolic mirror also intersects the ellipsoidal mirror. As the intersection points are denoted by n and n', the coordinates of the intersection points are $(y_n, z_n)$ and $(y_{n'}, z_{n'})$, wherein $z_n = z_{n'}$. Herein, as a coordinate along the Z-axis on the reflection surface on the reflector is denoted by $Z_r$, the second parabolic mirror is employed in the range of $z_r \geq z_n$.

As summarizing through the whole, in the three curves, the first parabola is employed in the range of $z_r < z_1$, the ellipsoid is employed in the range of $z_1 < z_r < z_n$, the second parabola is employed in the range of $z_r \geq z_n$, and they are revolved around the Z-axis to form the first parabolic mirror, the ellipsoidal mirror, and the second parabolic mirror, respectively.

In this way, although the luminous flux with angle $\theta_{24}$ among the luminous flux included in the angles $\theta_{23}$ and $\theta_{24}$ still cannot be utilized, the luminous flux included in the angle $\theta_{23}$ can be effectively utilized as return light.

The eighth embodiment according to the present invention will be illustrated with reference to FIG. 20 and FIG. 21. In the aforementioned embodiments, the front mirror is configured as a plane mirror. However, in the present embodiment, the front mirror is configured as a parabolic mirror to further improve the usability of light.

First, similar to the case shown in FIG. 13, the principle of the present embodiment will be illustrated with reference to FIG. 20. Similar to the case described above, the horizontal axis is the Z-axis, the vertical axis is the Y-axis, and as a focal point of a parabola forming the first parabolic mirror is an original point, the formula of the parabola 1 may be represented by $y^2 = 4f(z+f)$ similar to the case shown in FIG. 13, wherein f is a focal length of the parabola 1. Also, as a focal point of a parabola 2 forming the second parabolic mirror facing to the opposite direction of the first parabolic mirror is set at an original point, the formula of the parabola 2 is represented by $y^2 = -4g(z-g)$, wherein g is the focal length of the parabola 2. In addition, the distance from the Z-axis to the top of a window of the front mirror is represented by w and the intersection points of the second parabolic mirror are represented by m and m' which are represented on the curve M among curves M, M' and M" represented as parabola 2 in FIG. 20.

The principle of the method for using emissions from the light source 3 effectively as collimated light using the reflector configured in this way will be illustrated. Herein, in general, in order to insert, mount and hold the light source 3 to the reflector, it is necessary to provide a substantially cylindrical hole ($\phi$d) revolved about the Z-axis with y=d/2. That is, in the first parabolic mirror, this half portion cannot be a mirror surface, and consequently not all areas of the surface can be utilized. Also, the principle is explained under the condition that luminous flux cannot be physically emitted in the direction of the position of the electrodes with respect to the property of the light source. A segment from the original point to the intersection point m is at the maximum inclusive angle or a coverage angle $\theta$ of luminous flux emitted from the light source on the light axis.

As a point source is placed at the original point or the focal point:

1. A light ray along line 1' not shown in FIG. 20 just slightly inside an intersection point of a line 10 and the parabolic mirror 1 becomes parallel to the Z-axis and is emitted outward (right direction in FIG. 20).

2. A light ray along line 1 just slightly outside an intersection point of the line 10 and the parabolic mirror 1 becomes parallel to the Z-axis and is directed toward the right direction along the line 10, however, the light ray is reflected from the surface of the parabolic mirror 2 and returns to the original point along the line 5, and further is directed to the parabolic mirror 1.

The light ray on the line 5 makes a convolution with a light ray directly generated from the light source, is reflected at the intersection point of the parabolic mirror 1, becomes parallel to the Z-axis, and is emitted outward (right direction in the FIG. 20) from the window along the line 9.

3. An emitted light ray on the line 5 from the first time is reflected from the parabolic mirror 1, becomes parallel to Z-axis, is directed to the parabolic mirror 1 along the line 10, becomes a light ray along the line 1 at the intersection point, returns to the original point and further is directed to the parabolic mirror 1.

The light ray on the line 1 makes a convolution with a light ray directly generated from the light source, is reflected at the intersection point of the parabolic mirror 1, becomes parallel to Z-axis, and is emitted outward (right direction in FIG. 20) from the window along the line 6.

4. An emitted light ray on the line 2 from the first time makes a convolution with the directly emitted light ray based on the principle similar to the case 2 and is emitted outward along the line 8.

5. An emitted light ray on the line 4 from the first time makes a convolution with the directly emitted light ray based on the principle similar to the case 3 and is emitted outward along the line 7.

6. A light ray directly emitted to the intersection point of the parabolic mirror 1 and the parabolic mirror 2, which is not shown in FIG. 20, returns to the original point again in principle, makes a convolution with the directly generated light ray, is reflected from the parabolic mirror 1 again to become parallel to Z-axis and is emitted outward.

In this way, among luminous flux generated from the light source, luminous flux with a radiation angle in the range of $|\theta|–|\theta'|$ is emitted outward as effective collimated light so that luminous flux from the light source 3 can be utilized effectively.

Furthermore, as compared to the method in which a plane mirror is employed as the front mirror, since the light source 3 has a volume (not a point source), the light source 3 is not completely collimated light so that the light is reflected with confused angles on the plane mirror. However, according to the present embodiment, since the confused angles are made small by the parabolic mirror 2 and the light is reflected, load of a subsequently used optical element is decreased.

Next, the relationship between the parabola 2 and m or m' will be illustrated by curves M, M' and M". Among these, the curve M is at an ideal position. That is, the absolute value of the Y-coordinate of the intersection point of the line 5 and the parabola 1 is y=d/2, the focal length g of the parabola 2:

$$y^2 = -4g(z-g)$$

is decided so that the parabola 2 is at the position where the intersection point with the line 5 and the line 10 is at m.

In this way, the luminous flux with radiation angles in the range of $|\theta|–|\theta'|$ as described above can all be used effectively.

As the parabola 2 is placed at the curve M' outside the curve M, a light ray reflected at the intersection point of the line 10 and the parabola 2 is directed to the original point outside of the line 5, and the light ray intersects the parabola 1 on a extension line of the direction. The absolute value of the y-coordinate of the intersection point is smaller than y=d/2 and the light ray enters the hole for holding the lamp so that the light ray cannot be taken as effective light.

As the parabola 2 is place at the curve M" inside the curve M, the intersection point of the line 10 and the parabola 2 is inside the line 5 so that a light ray along the line 5 generated from the light source does not become collimated light and is emitted outward. That is, the coverage angle θ becomes small and the amount of useless flux in luminous flux emitted from the light source 3 is increased.

Thus, it is clear that as compared to the position of the curve M, although efficiency at the positions of curves M' and M" is somewhat reduced, it is much more effective than methods in the prior art.

Figure 20:
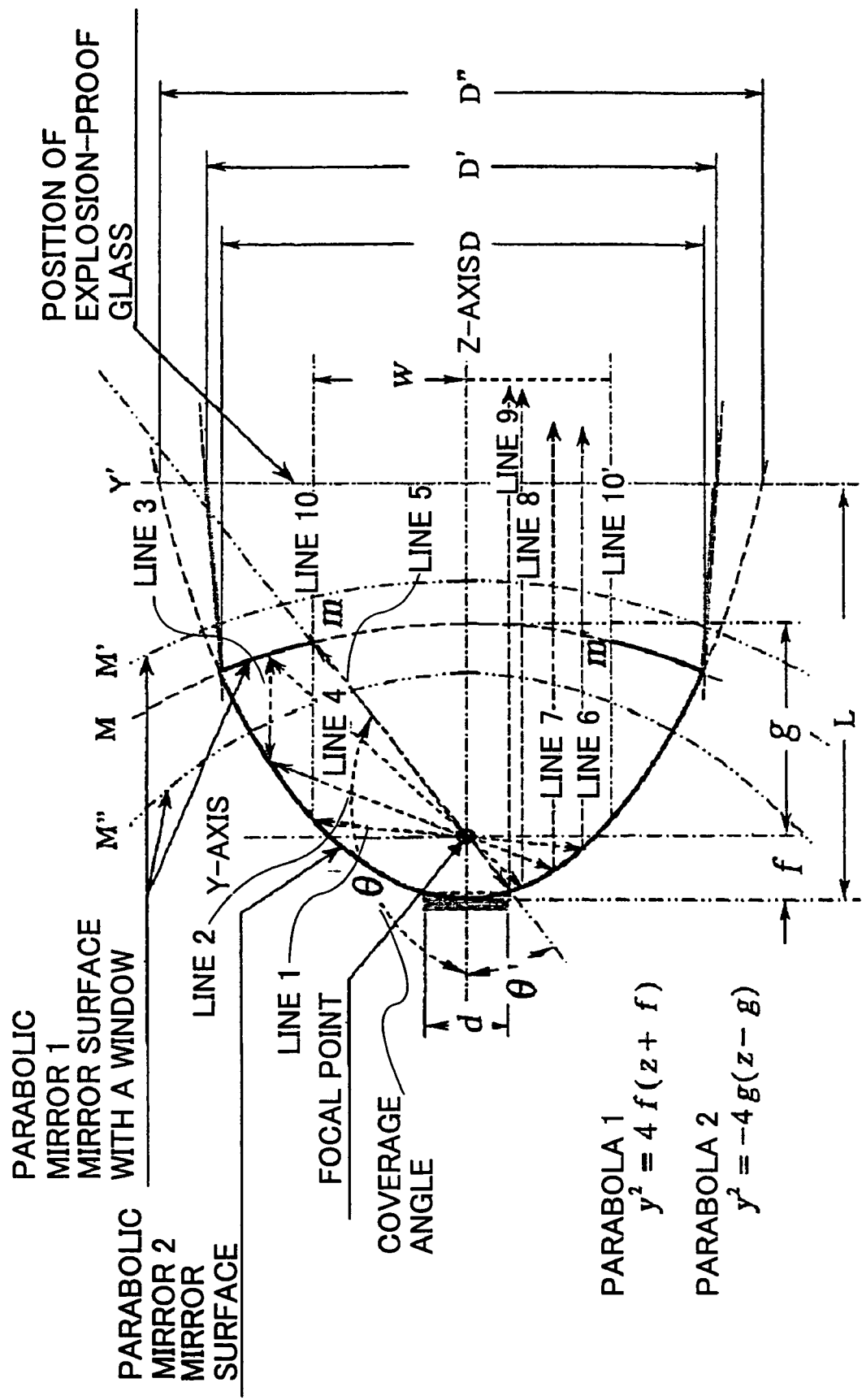
FIG. 20 is a schematic diagram illustrating a principle of a reflector according to the eighth embodiment of the present invention.

Also, the position of explosion proof glass is decided independently on the curves in FIG. 20 in order to place the explosion proof glass at the position where a supporter for the electrodes is taken inside because of the shape of the light source. If by drilling a hole to pierce the supporter for the lamp electrodes of the light source, rendering the supporter for the lamp electrode shorter, and changing the relation between the focal length of the parabola 1 and the focal length of the parabola 2, the supporter for the lamp electrodes can be taken inside, the explosion proof glass may be located at any of the positions of curves M, M' and M". That is, explosion proof glass in the shape of the parabola 2 is formed and a mirror with window is formed on one surface of the explosion proof glass to make it possible to decrease the number of members.

Next, the shape of a window 26 provided on a second parabolic mirror 35 will be illustrated with reference to FIG. 21. Herein, it is assumed that the size of a lens element constituting the aforementioned fly-eye lens-array 9 of the integrator optical system 5 is H=4 mm in the horizontal direction and V=3 mm in the vertical direction and the fly-eye lens-array is configured so that 7×9 lens elements are arranged.

On such conditions, the basic shape of the window is a rectangular shape of the horizontal side of 4 mm×7=28 mm and the vertical side of 3 mm×9=27 mm.

However, for a later-mentioned projector using a reflection LCD, the smaller the incidence angle of light entering the LCD panel surface is, the more the performance for contrast and color unevenness is improved. Hence, the luminous flux passing through a diagonal lens element, of which the incidence angle is relatively large, may not be used. In addition, in the present embodiment, the luminous flux reaching to the diagonal lens element can be reflected, utilized again, and made high-quality luminous flux near the center so that overall efficiency can be improved.

Figure 21:
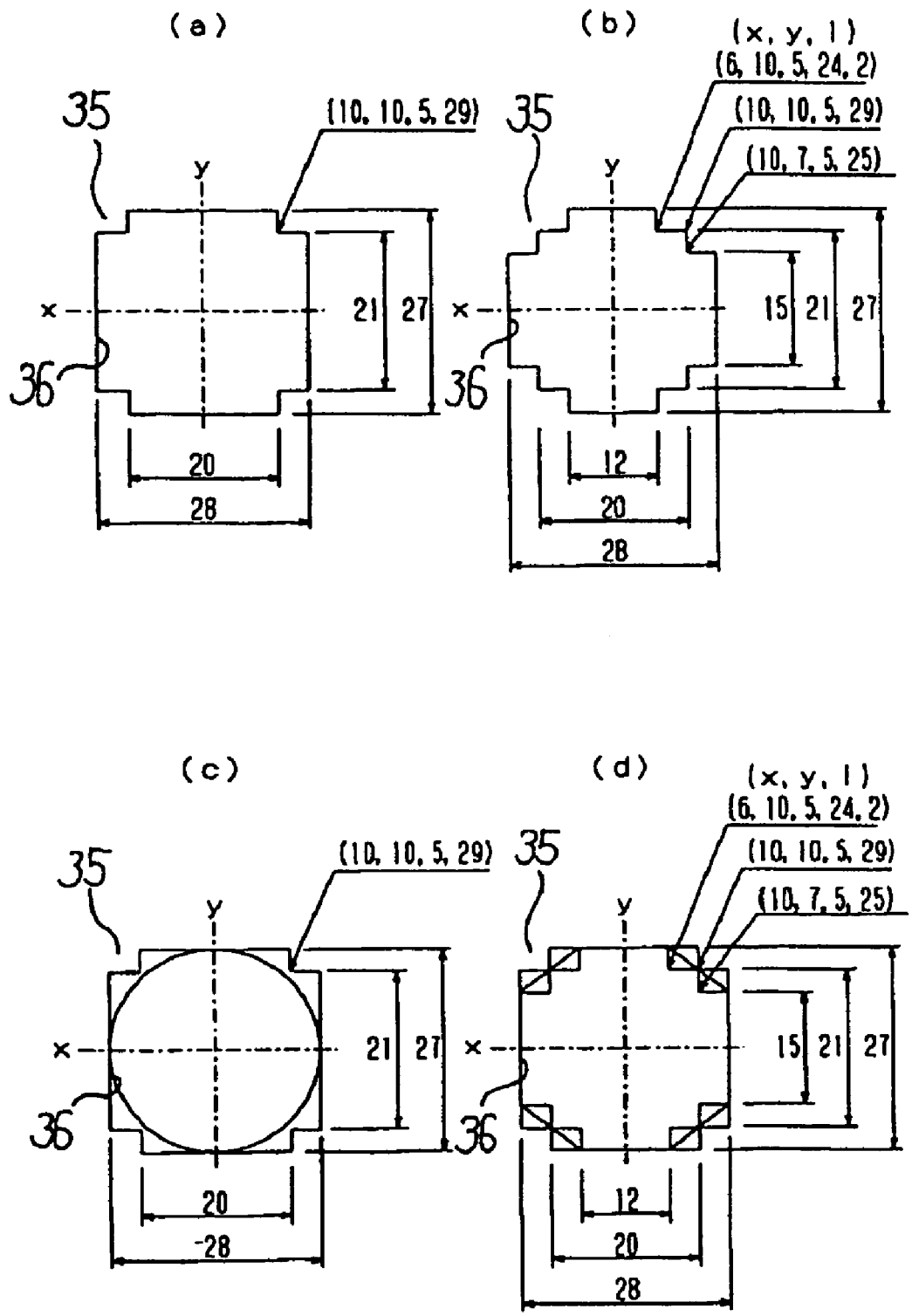
FIG. 21 is an elevation view of a window of a second parabolic mirror.

FIG. 21(*a*) shows an example in which a range covering one diagonal lens element is a reflection surface or a part of the second parabolic mirror 35 and FIG. 21(*b*) shows an example in which a range covering each of three diagonal lens elements is a reflection surface or a part of the second parabolic mirror 35. Herein, numerical values in parenthesis in FIG. 21 are (x, y, l), that is, show x-coordinate, y-coordinate of the corresponding point, and a diagonal length l being point symmetric about the original point, respectively. In the case of FIG. 21(*b*), the minimum distance of the window 36 is 24.2 mm so that it is advantageous that the position of the line 10 is rendered w=12.1 mm in FIG. 20. This is similar to the case of the aforementioned embodiments using a plane mirror as the front mirror.

Furthermore, if the light axis can be set precisely and maintained, it is not necessary to configure the window in the lens element unit shown in FIG. 21(c) or FIG. 21(d). FIG. 21(c) is an example of forming the window 36 in the shape of an ellipsoid or a circle inscribing the rectangle profile and FIG. 21(d) is an example of dividing the four sets of the three lens elements on the four corners by the diagonal lines and forming the entire window 36 in the shape of an octagon. In the examples of FIG. 21(c) and FIG. 21(d), since luminous flux passes through only a part of a lens element, unevenness of illuminance may be caused in only one lens element, however, the illuminance caused by the convolution with respect to all the lens elements causes little unevenness of illuminance by mutual compensation. Particularly, in the example shown in FIG. 21(d), two lens elements located on each of the four corners is in a relationship to compensate its diagonal lens element completely so that unevenness of illuminance is not caused at all theoretically. The minimum distances of both windows 36 are the same as the case of the rectangle 27 mm and therefore w=13.5 mm.

Thus, according to the present embodiment, by shaping luminous flux entering an integrator optical system into a circle or near circle, an luminous flux reaching to its periphery is reflected, utilized again, and made into high-quality luminous flux near the center so that overall efficiency can be improved.

Figure 22:
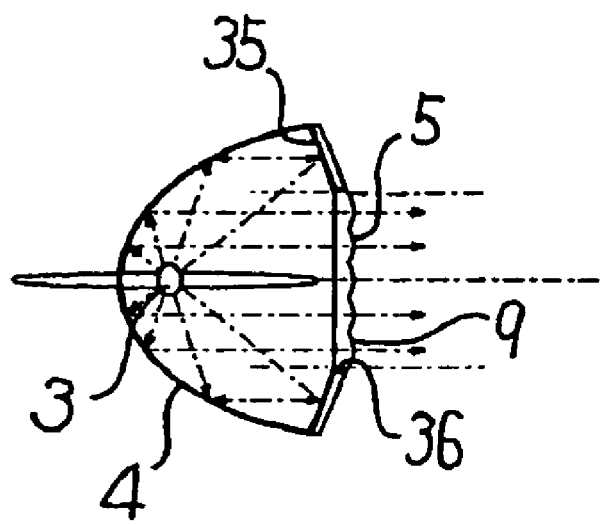
FIG. 22 is a cross-sectional diagram of a configuration near a reflector showing a main part of an illumination apparatus.
Figure 23:
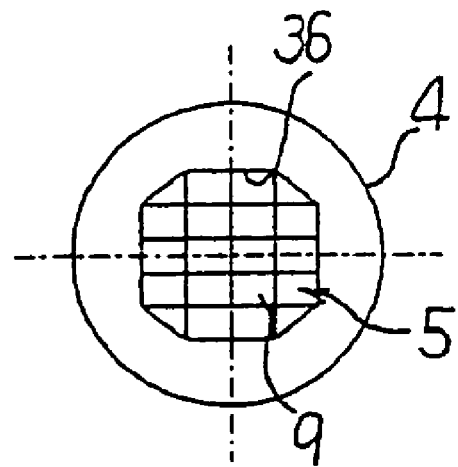
FIG. 23 is an elevation view of the reflector shown in FIG. 22.

Herein, for example, the position of the mirror surface of the second parabolic mirror 35 in FIG. 20 may be M', the explosion proof (the front glass 8) and the second parabolic mirror 35 may be in one unit, and further may also be configured in one unit with the first fly-eye lens-array 9 of the integrator optical system 5, shown in FIG. 22 and FIG. 23 in principle.

Figure 24:
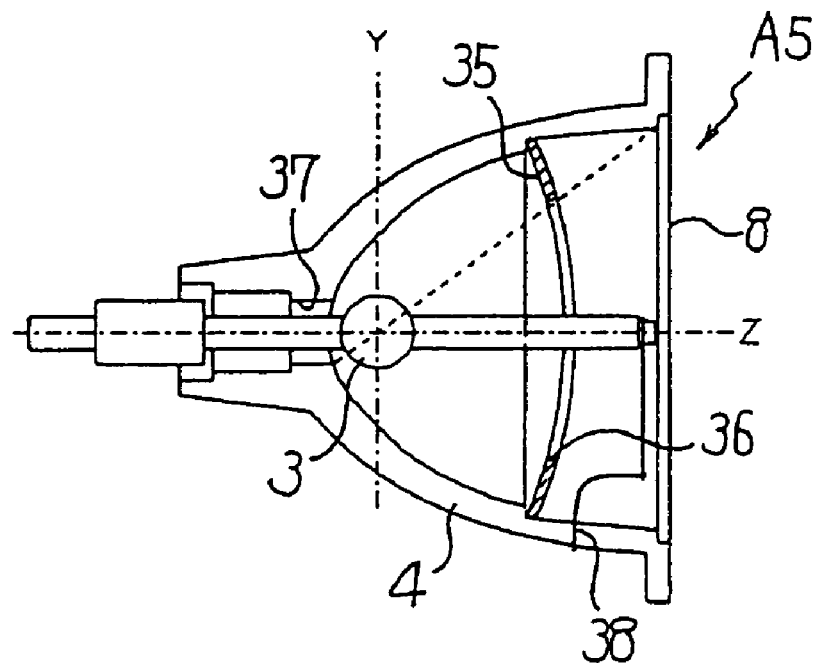
FIG. 24 is a cross-sectional diagram of a configuration near a reflector showing a main part of an illumination apparatus according to the ninth embodiment of the present invention.
Figure 25:
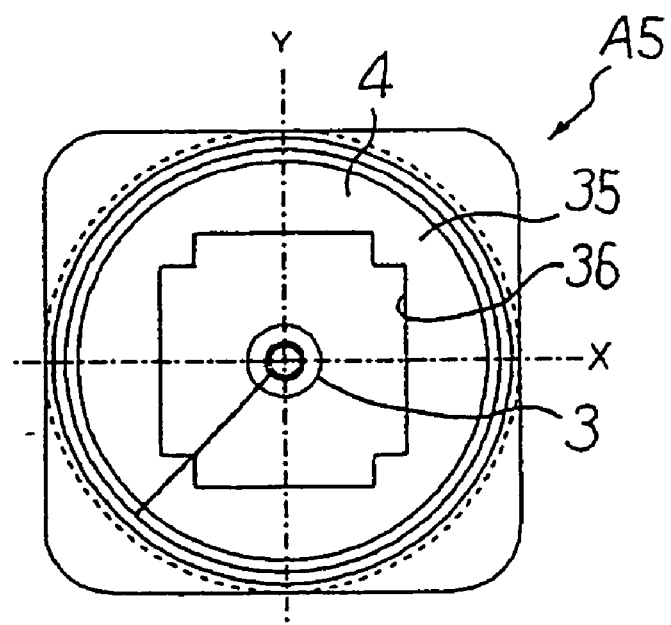
FIG. 25 is an elevation view of the reflector shown in FIG. 24.

The ninth embodiment according to the present invention will be illustrated with reference to FIG. 24 and FIG. 25. The present embodiment shows a configuration example of a specific illumination apparatus A5 using the second parabolic mirror as the front mirror in the aforementioned principle of the embodiment.

The parabolic mirror 4 (f=6 mm) for the reflector is made from reinforced glass and the second parabolic mirror 35 (g=21 mm) as the front glass is made from reinforced glass or normal glass. The insides of both mirrors are mirror surfaces. In this case, both expanding coefficients are almost same so that both mirrors are fixed by means of a thermostable adhesive. A part between the parabolic mirror 4 and the explosion-proof glass (the front glass 8) is formed into a cylindrical form with an elimination gradient by a fabrication mold. There is a substantially cylindrical drilled hole 37 for inserting, mounting and holding the light source 3 to the reflector or the parabolic mirror 4 and a hole for leader lines 38.

Figure 26:
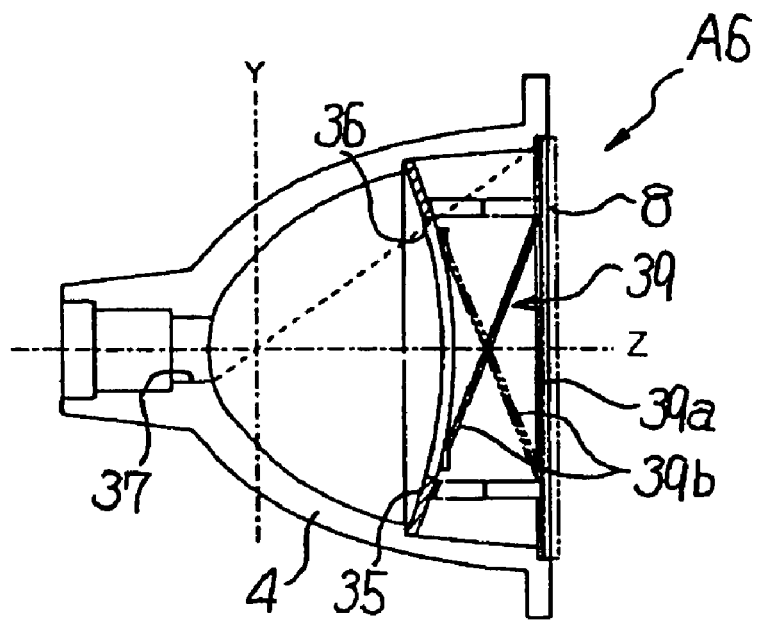
FIG. 26 is a cross-sectional diagram of a configuration near a reflector showing a main part of an illumination apparatus according to the tenth embodiment of the present invention.
Figure 27:
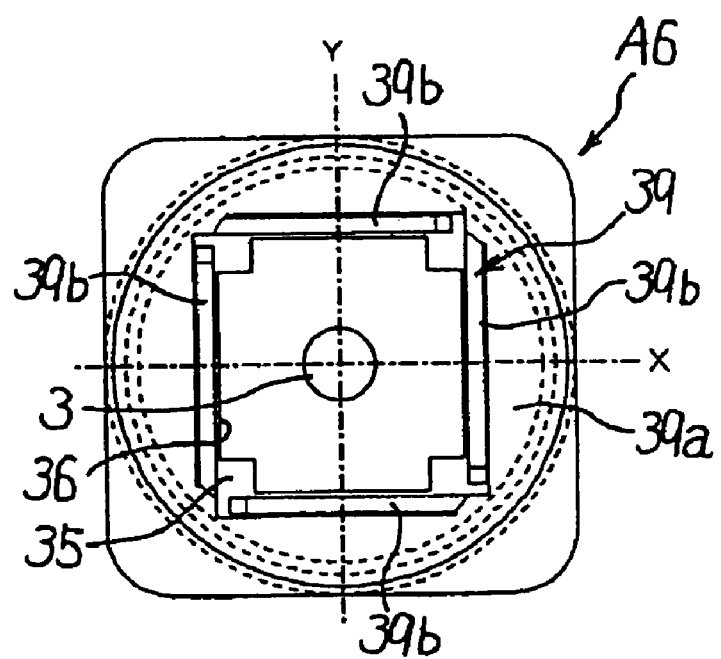
FIG. 27 is an elevation view of the reflector shown in FIG. 26.

The tenth embodiment according to the present invention will be illustrated with reference to FIG. 26 and FIG. 27. Although an illumination apparatus A6 of the present invention is basically similar to the case of the illumination apparatus A5, an application example is shown in the case of the second parabolic mirror 35 as the front mirror made from a metal such as high brightness aluminum and stainless steel, etc.

In this case, since reinforced glass is used in the parabolic mirror 4, the thermal expansion coefficients are different from each other and as both mirrors are fixed, the second parabolic mirror 35 may be deformed by heat generated at time of lighting the lamp. Accordingly, in the present embodiment, the parabolic mirror 4 and the second parabolic mirror 35 are not fixed by an adhesive, etc. but rendered free relative to each other and they are held at their arranged positions by spring members 39 applying a force holding the parabolic mirror 35 at a symmetrical position around Z-axis relative to the parabolic mirror 4. More specifically, four plate spring pieces 39b are formed in cross multiplication in mutual opposite sides by notches around a rectangular aperture formed so as not to obscure the window 36 at the center of the plate member 39a with elasticity such as provided by stainless steal and phosphor bronze. The plate member 39a is arranged directly below the explosion proof glass or the front glass 8 and fixed with the main body of the parabolic mirror 4 by an adhesive. The spring member 39 is not limited to the arrangement shown in FIG. 26 and FIG. 27 and may be a line-shaped spring and a coil spring, etc. In brief, if the spring member is arranged so that a force directed toward the parabolic mirror 4 is applied to the second parabolic mirror 35 symmetrically around the Z-axis, its shape is immaterial.

Figure 28:
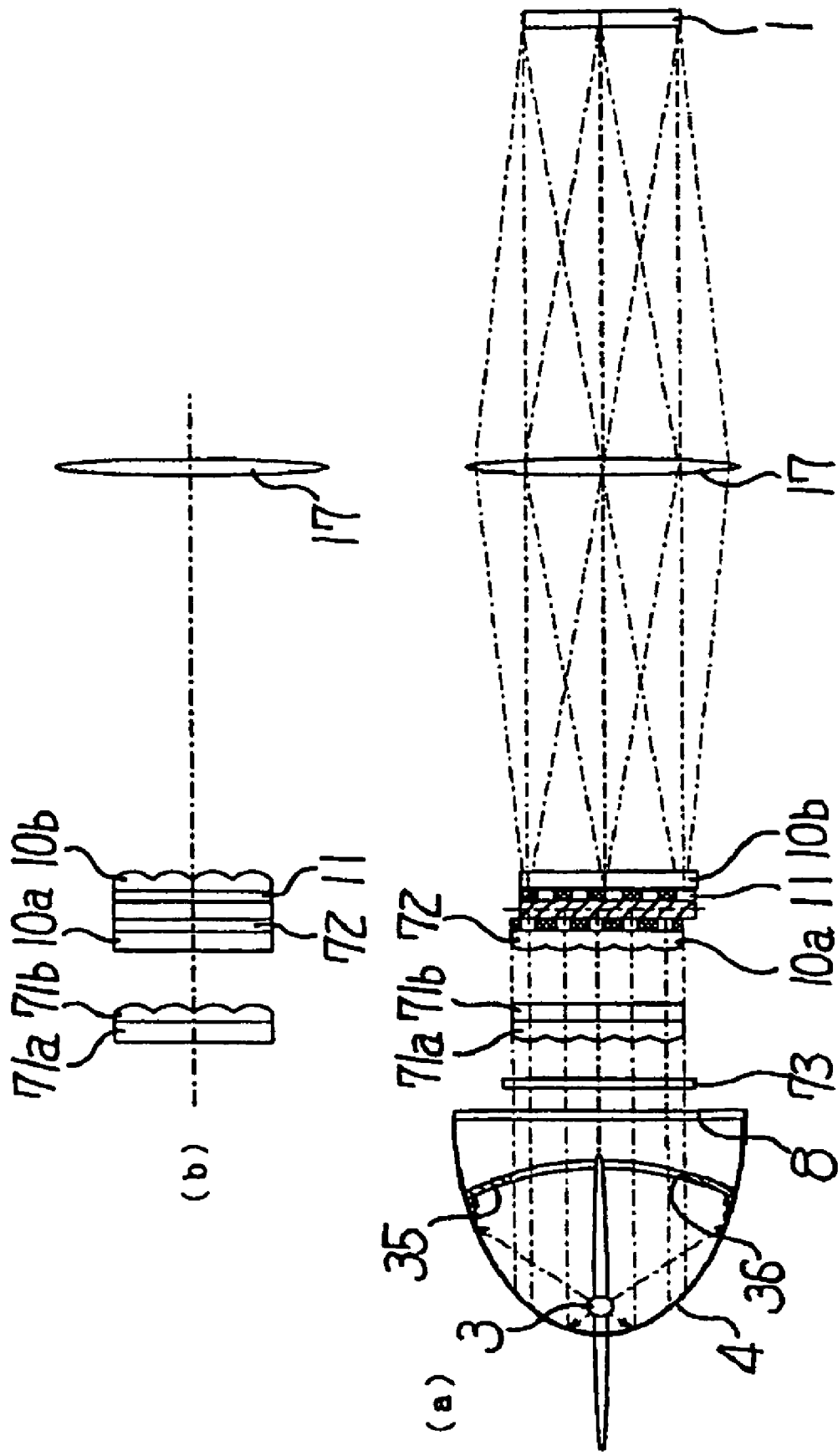
FIG. 28 is a schematic diagram showing an optical configuration of an illumination apparatus according to the eleventh embodiment of the present invention.

The eleventh embodiment according to the present invention will be illustrated with reference to FIG. 28. The present embodiment shows, for example, an application example in which the aforementioned illumination apparatus A5 or A6 is employed for illumination of a liquid crystal panel 1, similar to the case of FIG. 7, FIG. 8, FIG. 17 and FIG. 18, etc. The illumination apparatus A5 is shown in FIG. 28. In this case, as for an integrator optical system 5, one similar to the aforementioned case can be used. However, herein, an example is shown in which instead of the first fly-eye lens-array 5, as a corresponding member, orthogonal cylindrical lens arrays 71a and 71b are used and the window 36 on the second parabolic mirror 35 is formed to substantially correspond to the sizes of the orthogonal cylindrical lens arrays 71a and 71b. Also, a shielding plate array 72 is arranged in front of the polarization alignment prism 11 that is arranged between the orthogonal cylindrical lenses 10a and 10b corresponding to the second fly-eye lens-array. Also, a UV/IR cutting filter is indicated with the numeral 73. Furthermore, similar to the case of FIG. 8, a convex lens 17 is placed almost at the midpoint between the cylindrical lens 10b and the illuminated surface, wherein the focal length is matched to the distance from the convex lens 17 to the liquid crystal panel 1. Luminous flux divided into the segments by means of the second fly-eye lens-array or the orthogonal cylindrical lenses 10a and 10b overlap on the liquid crystal panel 1 being the illuminated surface.

By taking such configuration, from the convex lens 17 to the liquid crystal panel 1 being the illuminated surface, the luminous flux segments made by each component lens of the fly-eye lens-array are collimated light so that and it is advantageous that unevenness of color is hardly caused, particularly in the case of a projector using the reflection liquid crystal panel 1.

Figure 29:
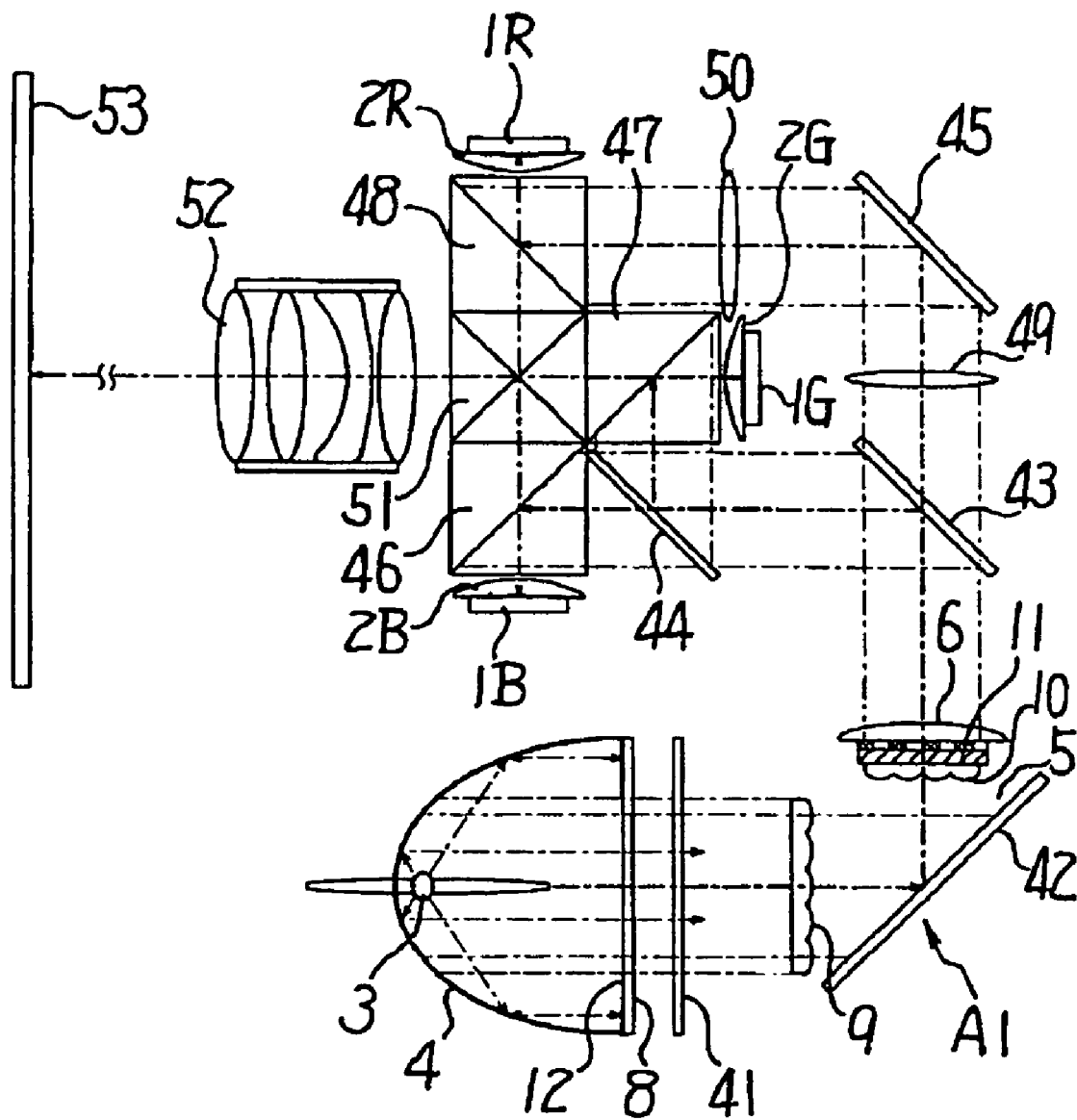
FIG. 29 is a schematic diagram showing an optical configuration of a liquid crystal projector according to the twelfth embodiment of the present invention.

The twelfth embodiment according to the present invention will be illustrated with reference to FIG. 29. The present embodiment shows, for example, an example of an application of the illumination apparatus A1 shown in FIG. 7 to a liquid crystal projector. Herein, in the illumination apparatus A1, a UV/IR cutting glass 41 is placed in front of the first fly-eye lens-array 9 and a mirror 42 is inserted for changing illumination direction by 90° between the first and the second fly-eye lens-arrays 9 and 10.

Collimated light aligned in S-polarization by the illumination apparatus A1 is divided into each color component R, G and B by dichroic mirrors 43 and 44 or prismatic mirrors and a total reflection mirror 45. Each component is led to a corresponding PBS or polarization beam splitter 46, 47, or

38, is reflected from the PBS film, and illuminates a reflection liquid crystal panel 1B, 1G or 1R respectively. 2B, 2G and 2R indicate condenser lenses and 49 and 50 indicate relay lenses.

Since each reflection liquid crystal panel 1B, 1G or 1R reflects and returns a pixel image about which an image signal provided from an image information control unit (not shown) is in OFF state, the pixel image is reflected from the PBS film again and returned to the illumination apparatus A1-side. On the other hand, since an image in ON state is converted to P-polarization and reflected, the image is transmitted through a PBS film and reaches to the light mixing prism 51 using a dichroic prism. Each color image is mixed on a dichroic film of the light mixing prism 51 and passes through a projection lens 52 as a projection lens system to project and image a liquid crystal panel display image on a screen 53.

The thirteenth embodiment according to the present invention will be illustrated with reference to FIG. 30. The present embodiment shows, for example, an example of an application of the illumination apparatus including the integrator optical system 5 using the convex lens as shown in FIG. 8 emitting to a liquid crystal projector. Herein, a UV/IR cutting glass 41 is provided in front of the first fly-eye lens-array and a plane mirror 60 is attached on one side of the UV/IR cutting glass 41.

Collimated light aligned to P-polarization by the illumination apparatus is led to a PBS 61, transmitted through the PBS, and further led to a light dividing and light mixing prism 62 using a dichroic prism. Here, the collimated light is divided into color components R, G and B, which illuminate corresponding reflection liquid crystal panels 1R, 1G and 1B, respectively. Since each reflection liquid crystal panel 1B, 1G or 1R reflects and returns a pixel image about which an image signal provided from an image information control unit (not shown) is in OFF state, after mixing on the light dividing and light mixing prism 62, the pixel image is transmitted through the PBS film of the PBS 61 again and returned to the illumination system. On the other hand, since an image in ON state is converted to S-polarization and reflected, after mixing on the light dividing and light mixing prism 62, the image is reflected from a PBS film of the PBS 61 and display images on reflection liquid crystal panels 1R, 1G and 1B are projected and imaged on a screen 64 through a projection lens 63 as a projection lens system.

Figure 30:
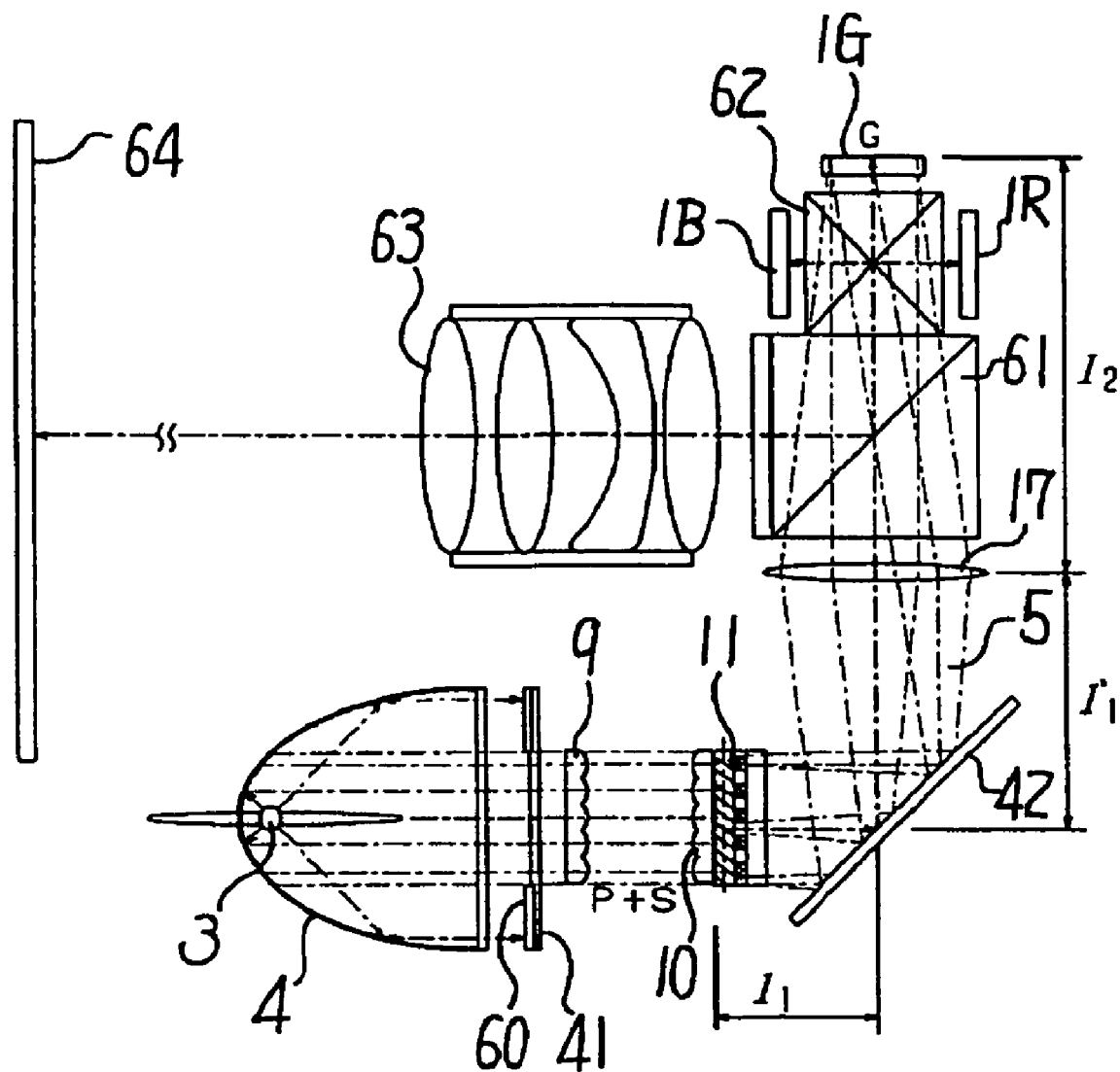
FIG. 30 is a schematic diagram showing an optical configuration of a liquid crystal projector according to the thirteenth embodiment of the present invention.

Also, in the example shown in FIG. 30, taking glass density into consideration, the relationship of the optical distances in the integrator optical system 5 is set to satisfy $l_1 + l_1' \cong l_2$.

Furthermore, the illumination apparatus, which is a combination of the reflector and the integrator optical system with respect to the liquid crystal projector shown in the twelfth or the thirteenth embodiment, is only selected to illustrate an effect of the present invention simply, and none of the combinations of the illumination apparatuses in the aforementioned embodiments deviates from the spirit of the invention. Particularly, with respect to the shape of the reflector, it is no problem to use any of the aforementioned shapes for any purpose.

Also, the twelfth and the thirteenth embodiments illustrate examples of application of the projector using the reflection liquid crystal display largely dependent on the angle of the illuminating radiation. However, since the essence of the present invention is improved light gathering power, it goes without saying that the present invention is applicable to a projector using transmission liquid crystal projector and a projector using a DMD or dynamic mirror device. In this case, the polarization conversion function can be omitted.

Figure 31:
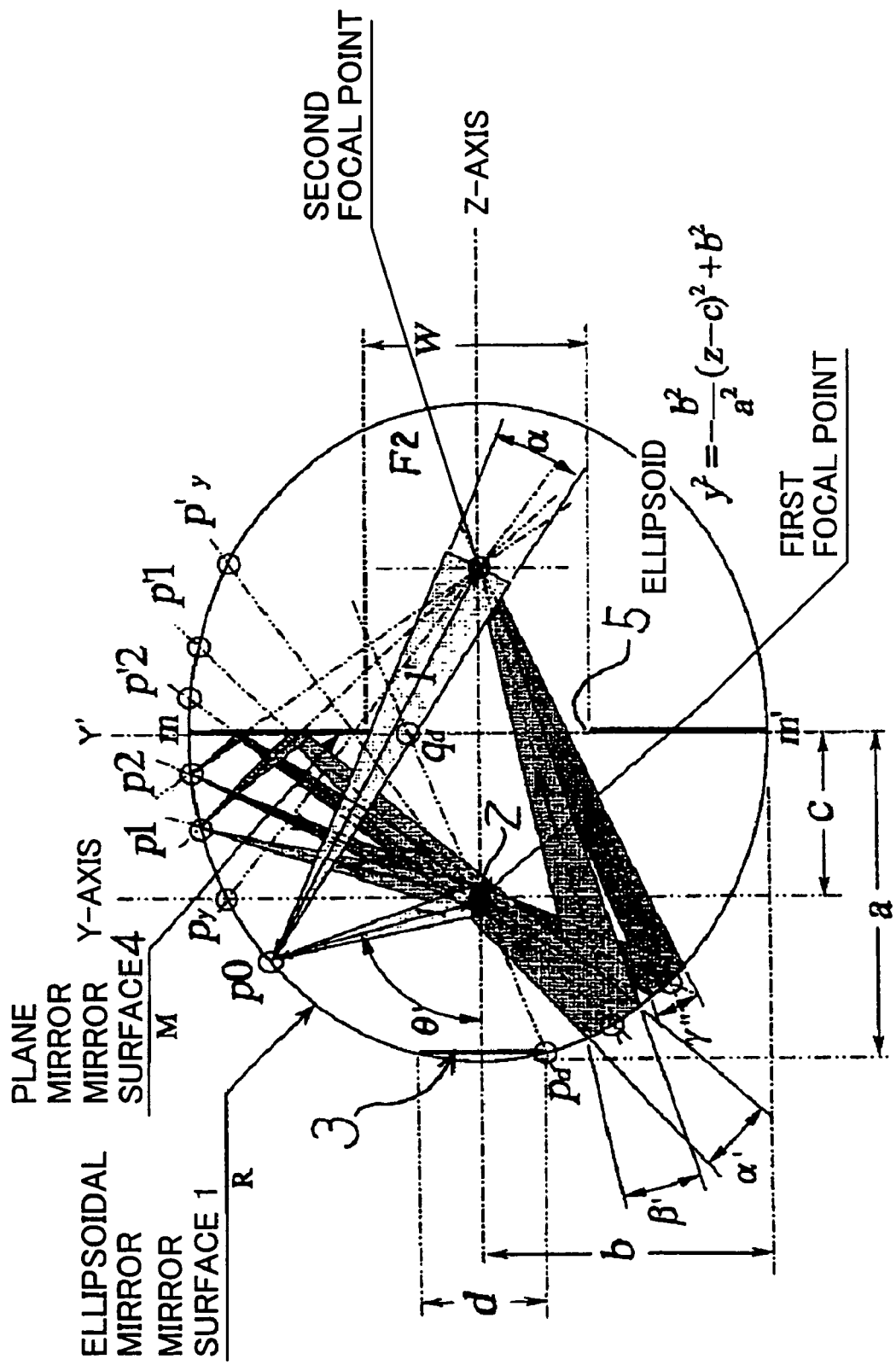
FIG. 31 is a schematic diagram illustrating a principle of a reflector configuration of the fourteenth embodiment of the present invention.

The fourteenth embodiment according to the present invention will be illustrated with reference to FIG. 31 and FIG. 32. First, with reference to FIG. 31, a principle of the illumination apparatus of the present embodiment according to the present invention will be illustrated. The illumination apparatus of the present embodiment is characterized in that an ellipsoidal mirror with a first focal point F1 and a second focal point F2 is employed as a reflector 1. Herein, a line through the first focal point F1 and the second focal point F2 is referred to as the light axis and is represented by the Z-axis. Also, an axis on the paper surface orthogonal to the Z-axis at the first focal point is referred to as the Y-axis and an axis orthogonal to the paper surface is referred to as the X-axis. Hence, the first focal point is an original point. In addition, a segment being a half of a major axis of an ellipsoid is denoted by a, a segment being a half of a minor axis is denoted by b, and a segment being a half of the distance between the first focal point F1 and the second focal point F2 is denoted by "c", an ellipsoidal mirror constituting a reflector 1 is formed by a part of a curve (a half along the direction of the major axis) formed by revolving an ellipsoid represented by:

$$y^2 = -(b^2/a^2)(z-c)^2 + b^2$$

around the Z-axis. On a part of such reflector 1, a light source holding hole 3, with a diameter of d, for supporting the light source 2 of an arc lamp is formed and the reflector 1 includes a part not serving as an ellipsoidal mirror for the light source holding hole 3.

For such reflector 1, a plane mirror 4 as the front mirror is arranged orthogonal to the Z-axis and on the minor axis or on the x'-y' plane of the ellipsoidal mirror. The plane mirror 4 has a mirror surface at the first focal point side and a window 5 is formed as an aperture with a width or diameter of w near the center, that is near the Z-axis, of the mirror surface for controlling an incidence angle to a collimator lens. That is, the window 5 has no mirror surface.

Furthermore, a light source 2 is arranged near the first focal point F1 of the ellipsoidal mirror of the reflector 1. The light source 2 has the length along the Z-axis of T.

A principle of the method for directing luminous flux generated from the light source 2 arranged near the first focal point to the second focal point F2 efficiently using the reflector 1 with the plane mirror 4 configured in this way will be illustrated. First, an open angle α of the luminous flux is determined by the size of the light source 2 (the length along Z-axis: T), an incidence angle θ' into the reflector 1, and a distance t from the light source 2 to the reflector 1. That is, the open angle is represented by $\alpha = \tan^{-1}\{(T/t)\sin\theta'\}$. The open angle becomes the maximum about the luminous flux reflected near the point py on the Y-axis in the ellipsoidal mirror.

As luminous flux reflected at the point p0 (to the left of the point py) on the ellipsoidal mirror is noted, the above open angle is an open angle α of the luminous flux directly reflected from the reflector 1.

As luminous flux is reflected at the point p1 (to the right of the point py) on the ellipsoidal mirror, the luminous flux is directed toward the second focal point F2, but the luminous flux is reflected from the plane mirror 4 and is directed to the first focal point F1 again, as if the light source 2 were placed at the second focal point F2 and the luminous flux were reflected at the point p1' and directed to the first focal point F1. The luminous flux passes through near the first focal point F1 and is reflected from the reflector 1 again. Since the mirror surface at that point is a concave surface of the ellipsoidal mirror, the divergent luminous flux is reflected to be focused or closed. Of course, since the centerline of the luminous flux is through the second focal point F2, the open angle of the focused luminous flux is the same angle as the open angle of the luminous flux directly reflected from the reflector 1. Herein, the open angle of the focused luminous flux is referred to β. That is, the luminous flux reflected at the point p1 is directed to the second focal point with an open angle α'. Afterward, the luminous flux is reflected from the plane mirror 4 and subsequently the reflector 1 respectively, and finally the luminous flux is directed to the second focal point F2 with an open angle β'.

Herein, the size W of the window formed on the mirror plane 4 so that a coverage angle θ is large is decreased, the luminous flux passes through the route: the reflector 1→the plane mirror 4→the reflector 1, enters the light source holding hole 3 with the diameter d for the light source 2. Luminous flux larger than the above luminous flux passes through the route: the plane mirror 4→the reflector 1→the reflector 1, for which luminous flux it is necessary to avoid entering the light source holding hole 3. That is, it is necessary for the size w of the window to be set to the size larger than the conic surface defined by the intersection point of the line through the point pd on the edge of the light source holding hole 3 and the first focal point F1 and the minor axis.

Furthermore, as luminous flux directed to the point p'2 is noted, the luminous flux is reflected from the plane mirror 4, subsequently reflected at the point p2 on the reflector 1 and directed to the first focal point F1, as if the light source 2 were placed at the second focal point F2 and the luminous flux is directed to the first focal point F1. In this case, an arc image formed on the first focal point is smaller than the arc of the light source 2. After the luminous flux passes through near the first focal point F1, the luminous flux is reflected from the reflector 1 again. Since the mirror surface at that point is also a concave surface, the divergent luminous flux is reflected to be focused or closed. Of course, since the centerline of the luminous flux is through the second focal point F2, the open angle of the focused luminous flux is the same angle as the open angle of the luminous flux directly reflected from the reflector 1. Herein, the open angle of the focused luminous flux is referred to γ. That is, the luminous flux reflected at the point p2 of the reflector 1, after being reflected from the plane mirror 4, is directed to the first focal point F1 with an open angle α". Afterward, the luminous flux is reflected from the reflector 1 again, and directed to the second focal point F2 with an open angle γ".

Figure 32:
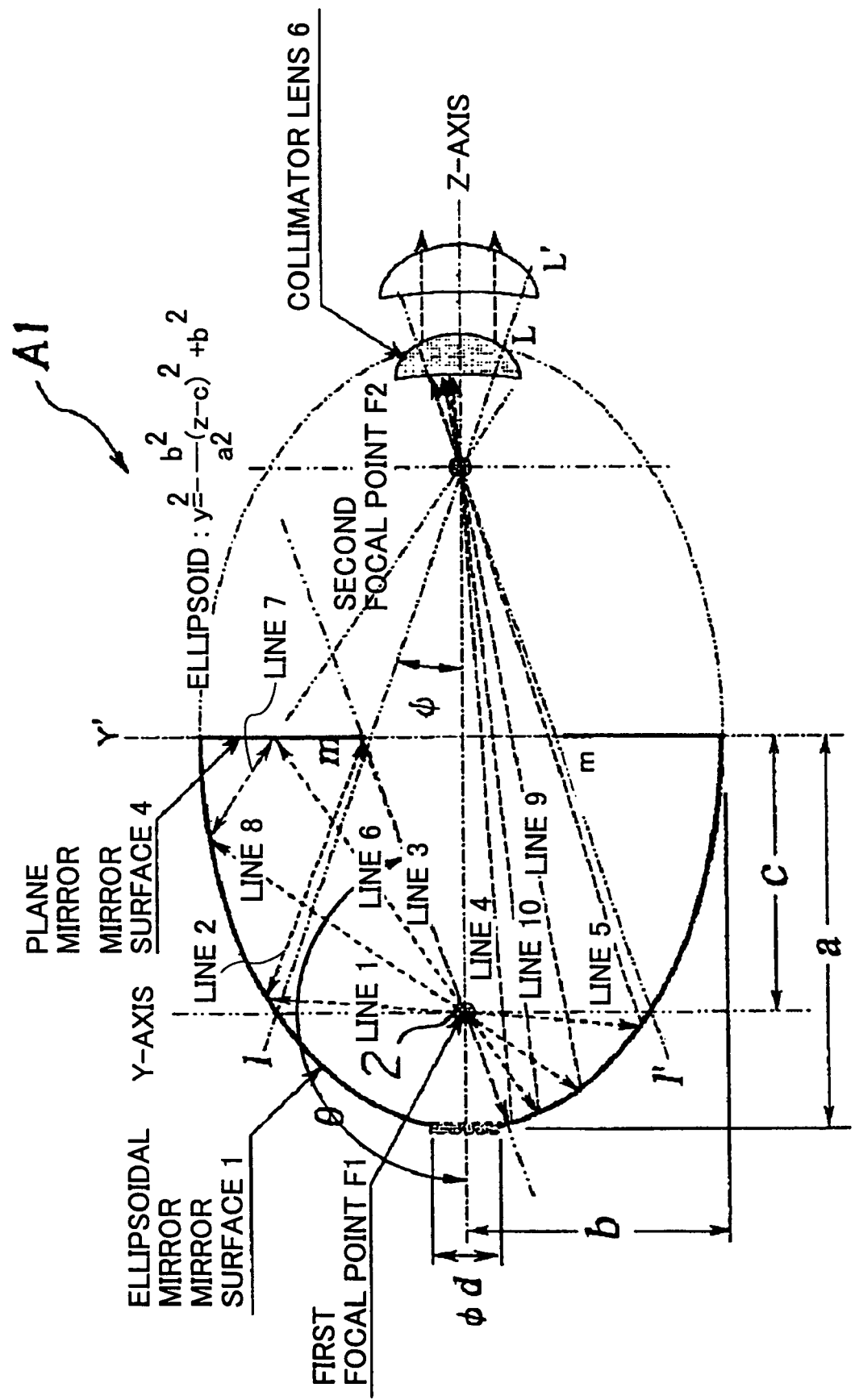
FIG. 32 is a schematic diagram illustrating a principle of a more specific reflector configuration in which a collimator lens is combined.

FIG. 32 shows a configuration example of the more practical illumination apparatus A1 configured so that a collimator lens 6 constituting at least one part of a collimation means is included under the above mentioned principle. The collimator lens 6 is arranged behind the second focal point F2 on the Z-axis. Herein, the collimator lens 6 is configured with a convex lens whose focal point is at the position of the second focal point F2. It is common that the collimator lens 6 is configured with a plurality of lenses including a concave lens for reducing chromatic aberration, but the collimator lens may be one aspherical lens. A specific set position of the collimator lens 6 depends on the size of the integrator optical system arranged behind the collimator lens 6, etc. and the collimator lens 6 is set at the best position indicated by L and L', etc.

In FIG. 32, lines l and l' through one of the intersection points of the ellipsoidal mirror constituting the reflector 1 and the Y-axis and the second focal point F2 of the ellipsoidal mirror are shown. The intersection points of the lines l and l' and the Y'-axis are also indicated by m and m' respectively. About light rays shown in FIG. 32, after a light ray along the line 1 is reflected from the ellipsoidal mirror along the line 2, the light ray is reflected from the plane mirror 4 along the line 3, passes through the first focal point F1, is reflected from the ellipsoidal mirror along the line 4 and is directed to the second focal point F2 to enter the collimator lens 6. A light ray being directed to the opposite direction along the line 1 is reflected from the ellipsoidal mirror and along the line 5 directed to the second focal point to enter the collimator lens 6. A light ray along the line 6 is first reflected from the plane mirror 4 along the line 7, subsequently, is reflected from the ellipsoidal mirror along the line 8, passes through the first focal point F1, is reflected from the ellipsoidal mirror along the line 9 and directed to the second focal point F2 to enter the collimator lens 6. Conversely, after a light ray along the line 8 is reflected from the ellipsoidal mirror along the line 7, the light ray is reflected from the plane mirror 4 along the line 6, passes through the first focal point F1, is reflected from the ellipsoidal mirror along the line 10 and is directed to the second focal point F2 to enter the collimator lens 6.

Of course, for light rays emitted from the light source 2, light rays directed to the opposite direction of the illustrated ones along the lines 6 and 8 are reflected from the ellipsoidal mirror and the light rays are directly directed to the second focal point F2 along the lines 10 and 9 respectively.

Herein, it should be noted that as the size of the window 5 on the plane mirror 4 is decreased to less than the size defined by the points m and m' at which lines l and l' intersect, among the light rays emitted from the first focal point F1, a light ray directed from the light source 2 to the region inside the points m and m' on the plane mirror 4 passes through the route: the plane mirror 4→the reflector 1→the reflector 1→the plane mirror 4→the reflector 1, afterward reaching to the second focal point F2 and the number of reflections is increased two times more, so that an amount of attenuation is increased so as to be not effective.

According to the present embodiment, to the reflector 1 made by the ellipsoidal mirror, the plane mirror 4 on which the size w of the window 5 is defined to a certain size is arranged at the position of the minor axis, the coverage angle θ of the reflector 1 can be substantially taken to be large so that the luminous flux generated from the light source 2 can be focused to the second focal point F2 and the incidence angle Ψ can be made small, so that the luminous flux enters the collimator lens 6. Thus, collimated light can be obtained efficiently.

The fifteenth embodiment according to the present invention will be illustrated with reference to FIG. 33. The same part as the part illustrated in the fourteenth embodiment is indicated by the same numerals and the illustration about the part will be omitted. The same will be applied for each of the following embodiments.

Figure 33:
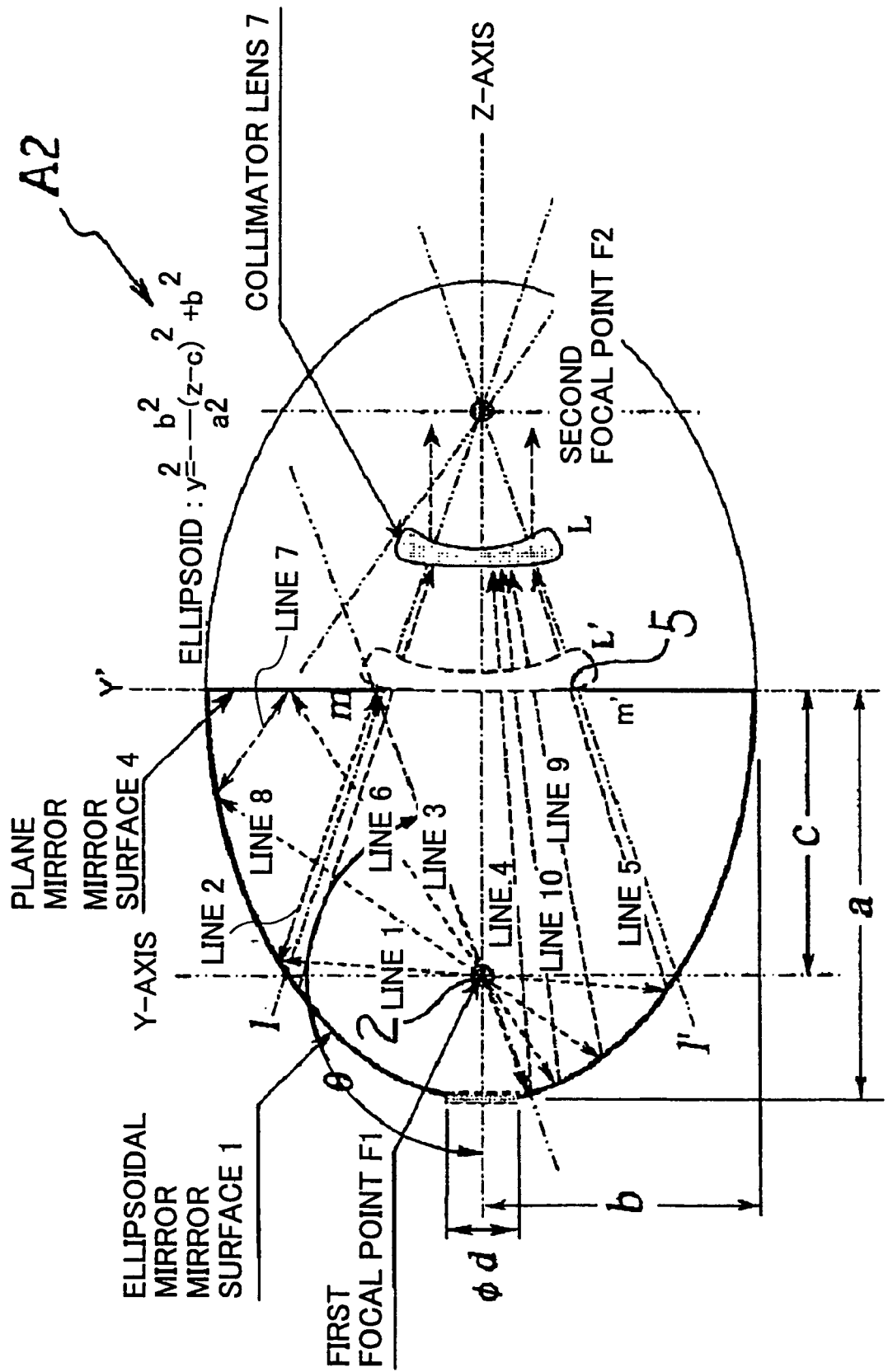
FIG. 33 is a schematic diagram illustrating a principle of a more specific reflector configuration in which a collimator lens of the fifteenth embodiment of the present invention is combined.

FIG. 33 shows a configuration example of the more practical illumination apparatus A2 configured so that a collimator lens 7 constituting at least one part of a collimated means is included. The collimator lens 7 is arranged between the plane mirror 4 and the second focal point F2 on the Z-axis. Herein, the collimator lens 7 is configured with a concave lens system whose focal point is at the position of the second focal point F2. It is common that the collimator lens 7 is configured with a plurality of lenses including a convex lens for reducing chromatic aberration, but the collimator lens may be one aspherical lens. A specific set position of the collimator lens 7 depends on the size of the integrator optical system arranged behind the collimator lens 7, etc. and the collimator lens is set at the best position indicated by L and L', etc.

In the case of the present embodiment, the same effect as the case of the fourteenth embodiment can be obtained.

Figure 34:
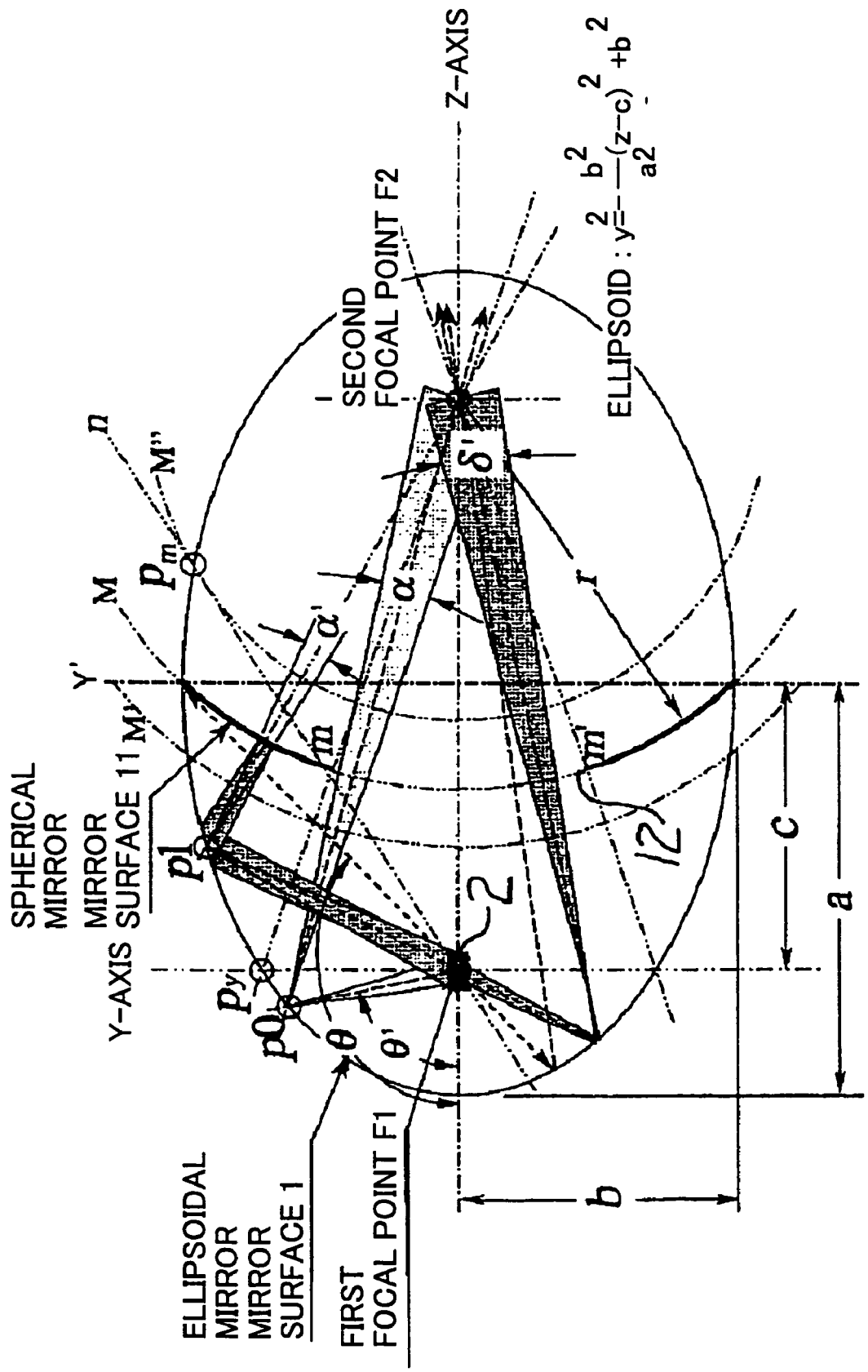
FIG. 34 is a schematic diagram illustrating a principle of a reflector configuration of the sixteenth embodiment of the present invention.

The sixteenth embodiment according to the present invention will be illustrated with reference to FIG. 34 and FIG. 35. First, with reference to FIG. 34, a principle of the illumination apparatus of the present embodiment according to the present invention will be illustrated. The illumination apparatus of the present embodiment is also characterized in that an ellipsoidal mirror with a first focal point F1 and a second focal point F2 is employed as a reflector 1. At the first focal point the light source 2 of an arc lamp is arranged. In the present embodiment, instead of the plane mirror 4, a spherical mirror 11 is arranged as the front mirror. The spherical mirror 11 is formed so that the position of the center is at the second focal pint F2 and a convex mirror surface with radius r is at the first focal point F1 side, and the spherical mirror is arranged between the first focal point F1 and the second focal point F2. On such spherical mirror 11, a window 12 is formed as an aperture with the size to control an incidence angle to a collimator lens, near the center of the mirror surface, that is, near the Z-axis.

A principle of the method for directing luminous flux generated from the light source 2 arranged near the first focal point to the second focal point F2 efficiently using the reflector 1 with the spherical mirror 11 configured in this way will be illustrated. First, as described in the fourteenth embodiment, an open angle $\alpha$ of the luminous flux is decided by the size of the light source 2 (the length along the Z-axis: T), an incidence angle $\theta'$ into the reflector 1, and a distance t from the light source 2 to the reflector 1. That is, the open angle is represented by $\alpha=\tan^{-1}\{(T/t)\sin\theta'\}$. The open angle becomes the maximum about the luminous flux reflected near the point py on the Y-axis in the ellipsoidal mirror.

As luminous flux reflected at the point p0 (to the left of the point py) on the ellipsoidal mirror is noted, the above open angle is an open angle $\alpha$ of the luminous flux directly reflected from the reflector 1.

As luminous flux is reflected at the point p1 (to the right of the point py) on the ellipsoidal mirror, the luminous flux with an open angle $\alpha$ is directed to the second focal point F2, but the luminous flux is reflected from the spherical mirror 11. In this case, a further divergent luminous flux is reflected. In the luminous flux, a center light ray emitted from the first focal point is just the same as the light ray generated from the point source placed at the second focal point F2, reflected at the point P1 and directed to the first focal point. However, in the entire luminous flux, since the luminous flux is divergently reflected from the spherical mirror 11, when the luminous flux is reflected at the point p1 on the reflector 1, the open angle is still more divergent than $\alpha'$.

However, since the mirror surface at the point p1 is a concave surface of the ellipsoidal mirror, the divergent luminous flux is conversely reflected to be focused or closed. The absolute value of the open angle is smaller than that of the divergent angle before the reflection. The centerline of the luminous flux is through the first focal point as described above and is reflected from the reflector 1 once again. Since the mirror surface at that point is a concave surface, the luminous flux is also reflected to be focused. Of course, since the centerline of the luminous flux passes through the second focal point F2, the open angle of the focused luminous flux is the same angle as the open angle of the luminous flux directly reflected from the reflector 1. Herein, the open angle of the focused luminous flux is referred to $\delta$. That is, although the luminous flux reflected at the point p1 is directed to the second focal point with an open angle $\alpha'$, the luminous flux is reflected from the spherical mirror 11 and then the reflector 1, and finally the luminous flux is directed to the second focal point F2 with an open angle $\delta'$.

In principle if the position of the spherical mirror 11 is between the first focal point F1 and the second focal point F2, the aforementioned matter is not changed. However, as the spherical mirror 11 is arranged at the position indicated by M in FIG. 34 so that a line n from the first focal point to the intersection point of the spherical mirror 11 and the ellipsoidal mirror or reflector 1 is a tangent of the spherical mirror 11, a luminous flux within a coverage angle $\theta$ can be effectively utilized. As the position of the spherical mirror 11 is closer to the second focal point F2 than M, shielding of luminous flux by the spherical surface occurs. Of course, the condition may be ignored due to another constraint. Also, an arrangement at the position such as M1 in FIG. 34 does not deviate from the idea of the present invention although the coverage angle is sacrificed.

Figure 35:
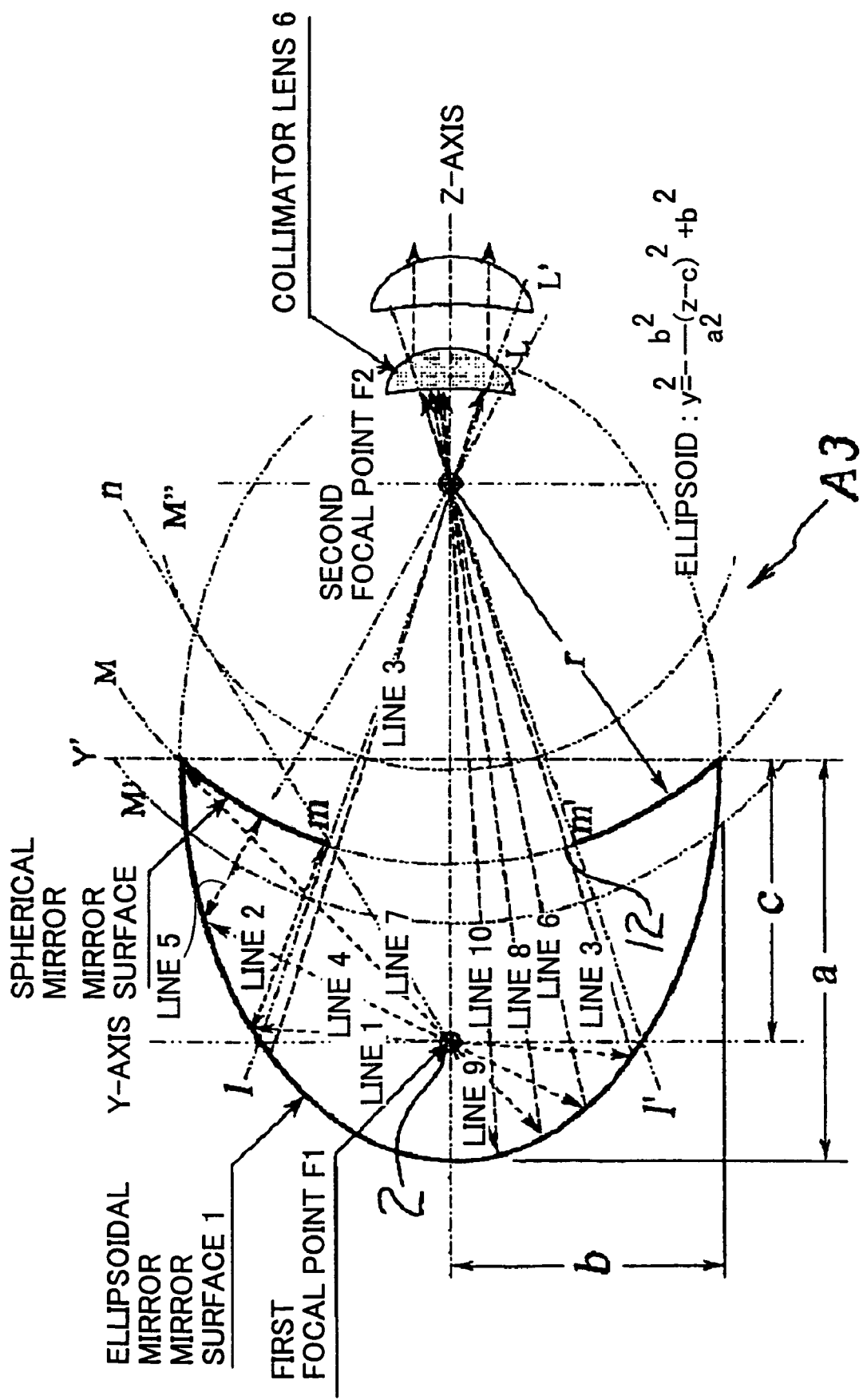
FIG. 35 is a schematic diagram illustrating a principle of a more specific reflector configuration in which a collimator lens is combined.

FIG. 35 shows an configuration example of the more practical illumination apparatus A3 configured so that a collimator lens 6 constituting at least one part of a collimation means is included under the above mentioned principle. The collimator lens 6 is arranged behind the second focal point F2 on the Z-axis. Herein, the collimator lens 6 is configured with a convex lens system of which the focal point is at the position of the second focal point F2. It is common that the collimator lens 6 is configured with a plurality of lenses including a concave lens for reducing chromatic aberration, but the collimator lens may be one aspherical lens. A specific set position of the collimator lens 6 depends on the size of the integrator optical system arranged behind the collimator lens 6, etc. and the collimator lens 6 is set at the best position indicated by L and L', etc. In FIG. 35, lines l and l' through one of the intersection points of the ellipsoidal mirror constituting the reflector 1 and the Y-axis and the second focal point F2 of the ellipsoidal mirror are shown. The intersection points of the lines l and l' and the Y'-axis are also indicated by m and m' respectively. About the light rays shown in FIG. 35, after a light ray along the line 1 is reflected by the ellipsoidal mirror along the line 2, the light ray is reflected from the spherical mirror 11 and returned along the line 2, passes through the first focal point F1, is reflected from the ellipsoidal mirror along the line 3 and is directed to the second focal point F2 to enter the collimator lens 6. After a light ray along the line 4 is reflected from the ellipsoidal mirror along the line 5, the light ray is reflected from the spherical mirror 11 and returned along the line 5, passes through the first focal point F1, is reflected from the ellipsoidal mirror along the line 6 and directed to the second focal point F2 to enter the collimator lens 6. Furthermore, a light ray along the line 7 is directly reflected from the ellipsoidal mirror and returned along the line 7, passes through the first focal point F1, reflected from the ellipsoidal mirror along the line 8 and directed to the second focal point F2 to enter the collimator lens 6. A light ray along the line 9 is reflected from the ellipsoidal mirror along the line 10 and directed to the second focal point F2 to enter the collimator lens 6.

Herein, it should be noted that as the size of the window 12 on the spherical mirror 11 is decreased to less than the size defined by the points m and m' at which lines l and l' intersect, respectively, among the light rays emitted from the first focal point F1, a light ray reflected from the reflector 1 and directed to the region inside the points m and m' on the spherical mirror 11 is reflected repeatedly such as the reflector 1→the spherical mirror 11→the reflector 1→the spherical mirror 11 and does not have a route to reach to the second focal point F2 so that the arrangement of the spherical mirror 11 is meaningless.

According to the present embodiment, as for the reflector 1 made by the ellipsoidal mirror, the spherical mirror 11 on which the size of the window 12 is defined to be a certain size is arranged between the first focal point F1 and the second focal point F2 on the light axis, the coverage angle θ of the reflector 1 can be taken to be substantially large so that the luminous flux generated from the light source 2 can be focused to the second focal point F2 and the incidence angle Ψ can be made small, so that the luminous flux can enter the collimator lens 6. Thus, collimated light can be obtained efficiently.

Figure 36:
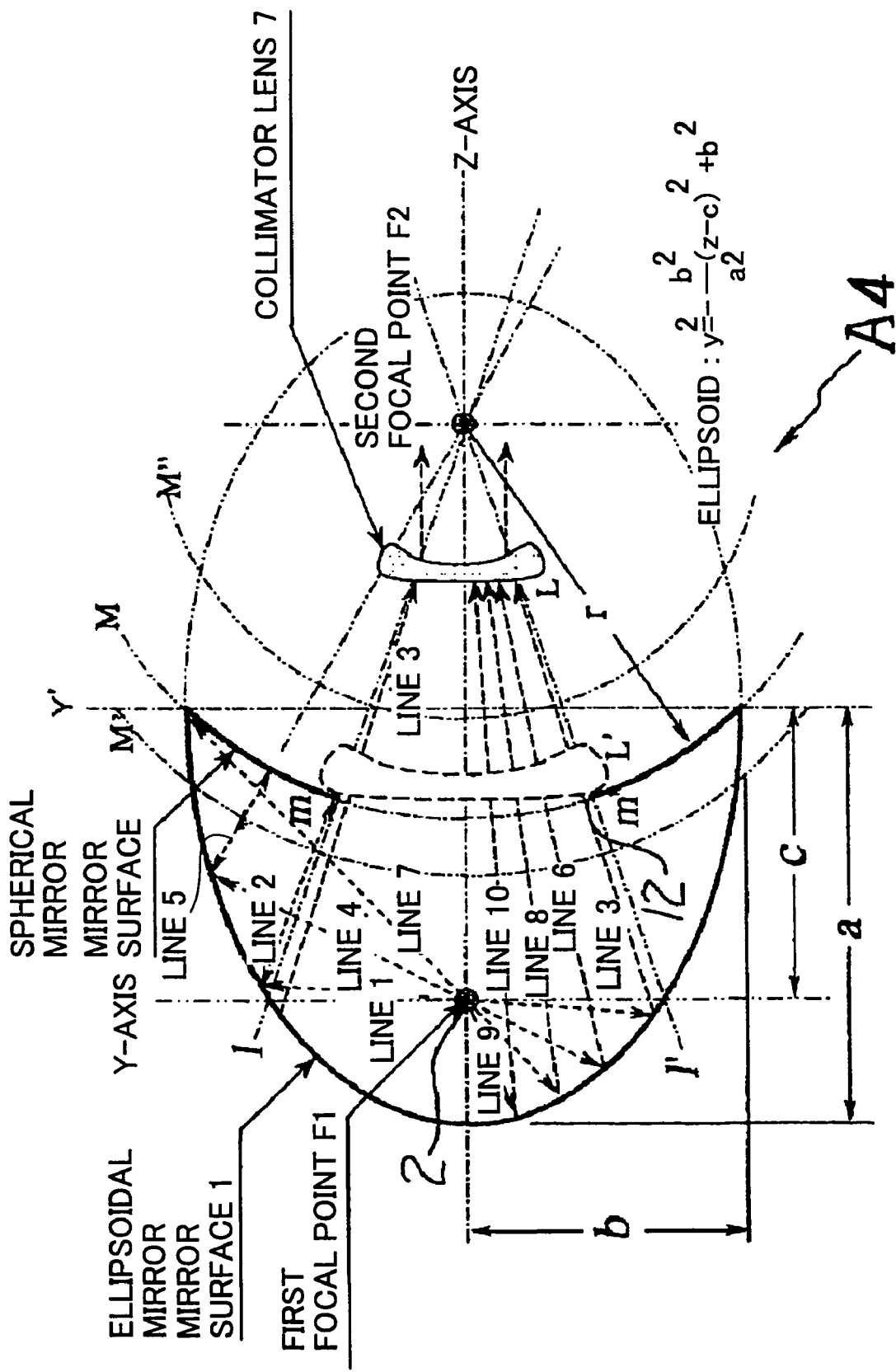
FIG. 36 is a schematic diagram illustrating a principle of a more specific reflector configuration in which a collimator lens of the seventeenth embodiment of the present invention is combined.

The seventeenth embodiment according to the present invention will be illustrated with reference to FIG. 36. As the same as the sixteenth embodiment, FIG. 36 shows a configuration example of the more practical illumination apparatus A4 configured so that a collimator lens 7 constituting at least one part of a collimation means is included. The collimator lens 7 is arranged between the spherical mirror 11 and the second focal point F2 on the Z-axis. Herein, the collimator lens 7 is configured with a concave lens system of which the focal point is at the position of the second focal point F2. It is common that the collimator lens 7 is configured with a plurality of lenses including a convex lens for reducing chromatic aberration, but the collimator lens may be one aspherical lens. A specific set position of the collimator lens 7 depends on the size of the integrator optical system arranged behind the collimator lens 7, etc. and the collimator lens 7 is set at the best position indicated by L and L', etc.

In the case of the present embodiment, the same effect as in the case of the sixteenth embodiment can be obtained.

Figure 37:
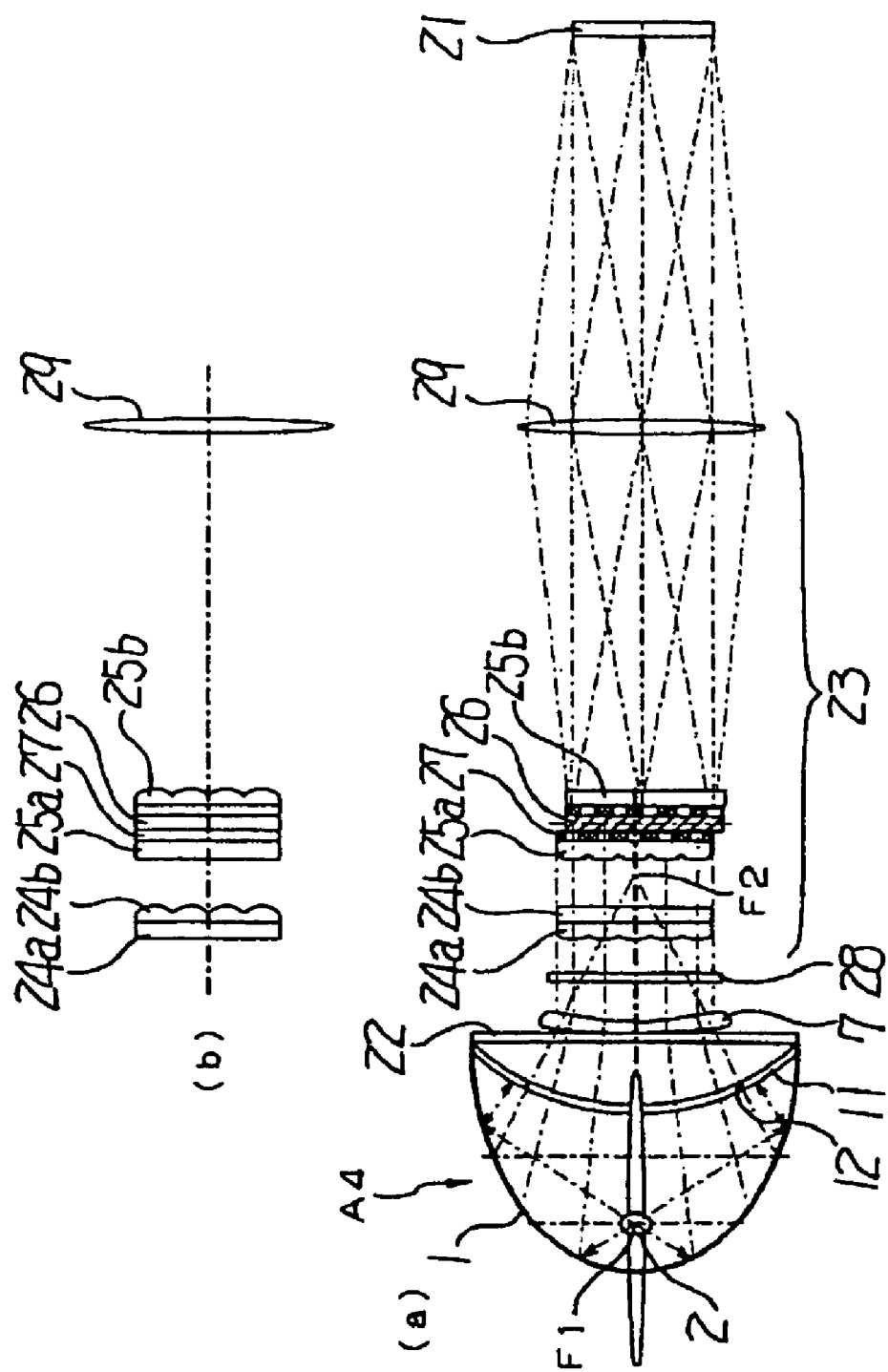
FIG. 37 is a schematic diagram of an optical configuration showing a main part of an illumination apparatus of the eighteenth embodiment of the present invention.

The eighteenth embodiment according to the present invention will be illustrated with reference to FIG. 37. The present embodiment shows an application example using the aforementioned illumination apparatus A4 for illuminating, for example, a rectangular liquid crystal panel or LCD 21 with an aspect ratio of a longitudinal side and a lateral side of 4:3.

That is, the illumination apparatus is configured so that the spherical mirror 11 is employed and collimation is made by the collimator lens 7 as a collimation means in front of the second focal point F2 of an ellipsoidal mirror or reflector, and may be the illumination apparatus A2. In the case of the present embodiment, one aspherical concave lens is employed as for the collimator lens 7. A front glass attached to an aperture part at the position of the minor axis of the reflector 1 is indicated by the numeral 22.

Also, in the case of the present embodiment, an output light utilizing optical system arranged between the illumination apparatus A4 and the liquid crystal panel 21 is an integrator optical system 23 with a polarization converter. Although the integrator optical system 23 may have various configurations, in the present embodiment, instead of a general first fly-eye lens-array, an example using an orthogonal cylindrical lens arrays 24a and 24b is shown. Also, a shielding plate array 27 is arranged in front of the polarization alignment prism 26 that is arranged between the orthogonal cylindrical lenses 25a and 25b corresponding to the second fly-eye lens-array. A UV/IR cutting filter is also indicated with the numeral 28. Furthermore, a convex lens 29 is placed almost at the midpoint between the cylindrical lens 25b and the illuminated surface, wherein the focal length is matched to the distance from the convex lens 29 to the liquid crystal panel 21. Luminous flux divided into segments by means of the second fly-eye lens-array or the orthogonal cylindrical lenses 25a and 25b overlap on the liquid crystal panel 21 being the illuminated surface.

By taking such configuration, from the convex lens 29 to the liquid crystal panel 21 being the illuminated surface, the luminous flux segments made by each component lens of the fly-eye lens-array is collimated light so that it is advantageous that unevenness of color is hardly caused, particularly in the case of a projector using the reflection liquid crystal panel 21.

In the present embodiment, with respect to a configuration of the integrator optical system 23, even if instead of the respective orthogonal cylindrical lens arrays, the first and the second fly-eye lens plates are employed, the essence of the present invention is not changed at all. In this case, it is preferred that the polarization converter corresponding to the polarization alignment prism 26 be arranged immediately behind the second fly-eye lens plate.

Figure 38:
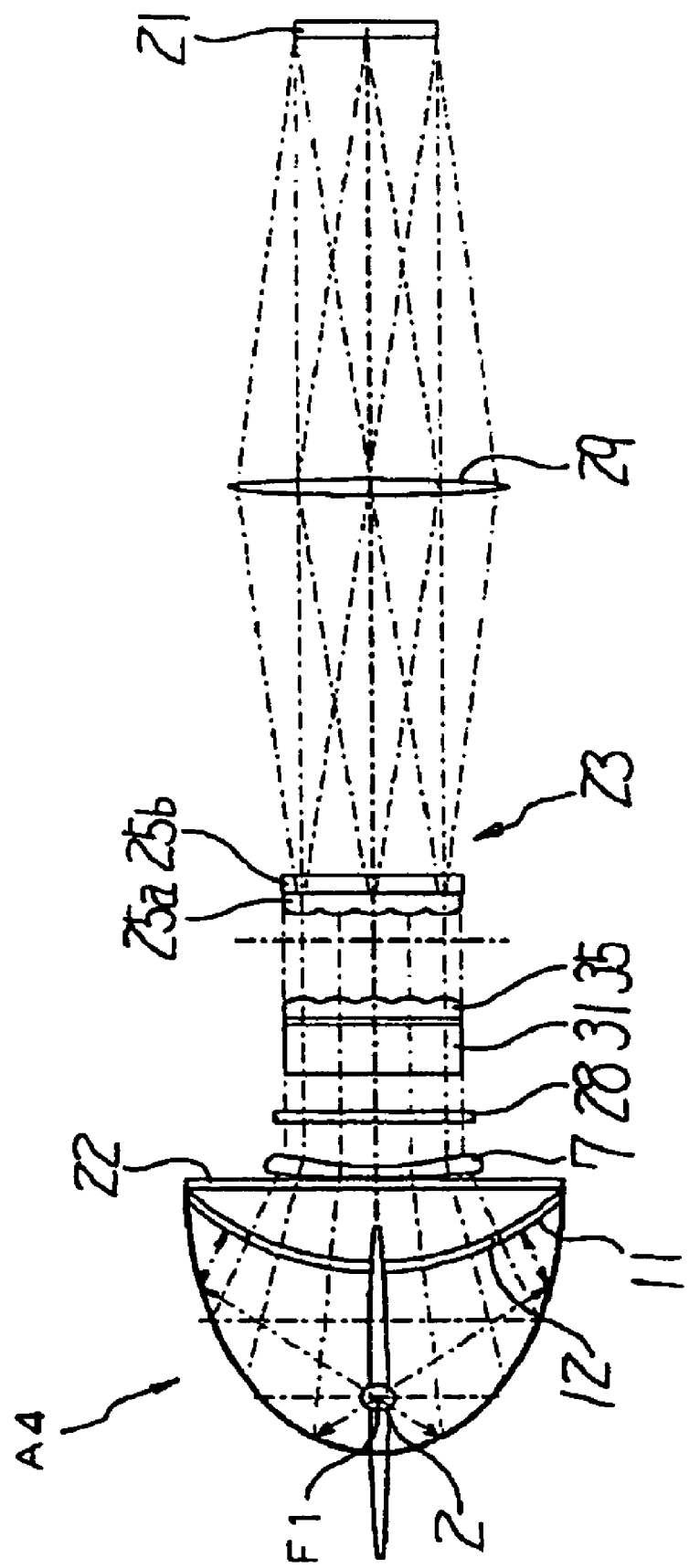
FIG. 38 is a schematic diagram of an optical configuration showing a variation of the main part of the illumination apparatus shown in FIG. 37.

Also, as shown in FIG. 38, instead of the polarization alignment prism 26 between the orthogonal cylindrical lenses 25a and 25b, the polarization converter 31 may be arranged immediately behind the illumination apparatus A4. That is, the polarization converter 31 corresponds to an optical element at the entrance part of the output light utilizing optical system. Herein, as referring to a polarization converter, the purpose and the function of the polarization converter are the same as those of the aforementioned polarization alignment prism array. However, since the shapes of them are slightly different from each other due to the relative position to the integrator optical system 23, another name is used. The polarization converter 31 is provided to the first fly-eye lens-array 35 as one unit, similar to the sixth embodiment according to the present invention as shown in FIG. 16, the polarization converter 31 is configured by combining six isosceles triangle-shaped prisms 32a through 32f into a centrosymmetric trapezoidal shape and forming PBS or polarization beam splitter films 33a through 33d on each slope of the prism. Since the PBS films 33a through 33d are formed to reflect S-polarization light and transmit P-polarization light, incident collimated light from the illumination apparatus A4 side is divided into S-polarization light and P-polarization light by first PBS films 33b and 33c located at the center part and the P-polarization light is transmitted by the polarization converter to be led to the integrator optical system 23. On the other hand, the S-polarization light is reflected, reflected again by the outer PBS films 33a and 33d, which may be total reflection mirrors alternatively, converted to P-polarization light by ½ wave plates 34a and 34b set on the exits of the prisms 32a and 32f, respectively, to be led to the integrator optical system 23.

Similar to the sixth embodiment according to the present invention, although the function of such polarization converter 31 could be achieved by the combination of three prisms, as the polarization converter is configured by using six prisms 32a through 32f and symmetrically combining two sets of three prisms like the present embodiment, compact configuration can be made so that the surface area on emission side or on the integrator optical system 23 side of the polarization converter 31 is twice the surface area on the light-receiving side or on the reflector 1 side. That is, as the shape of the input part of the integrator optical system 23 is the same as that of the case shown in FIG. 37, the surface area on the light-receiving side of the polarization converter 31, which may be half the size of the aperture of the window 12 on the spherical mirror 11, can also be decreased to match the total size of both prisms 32b and 32e.

Figure 39:
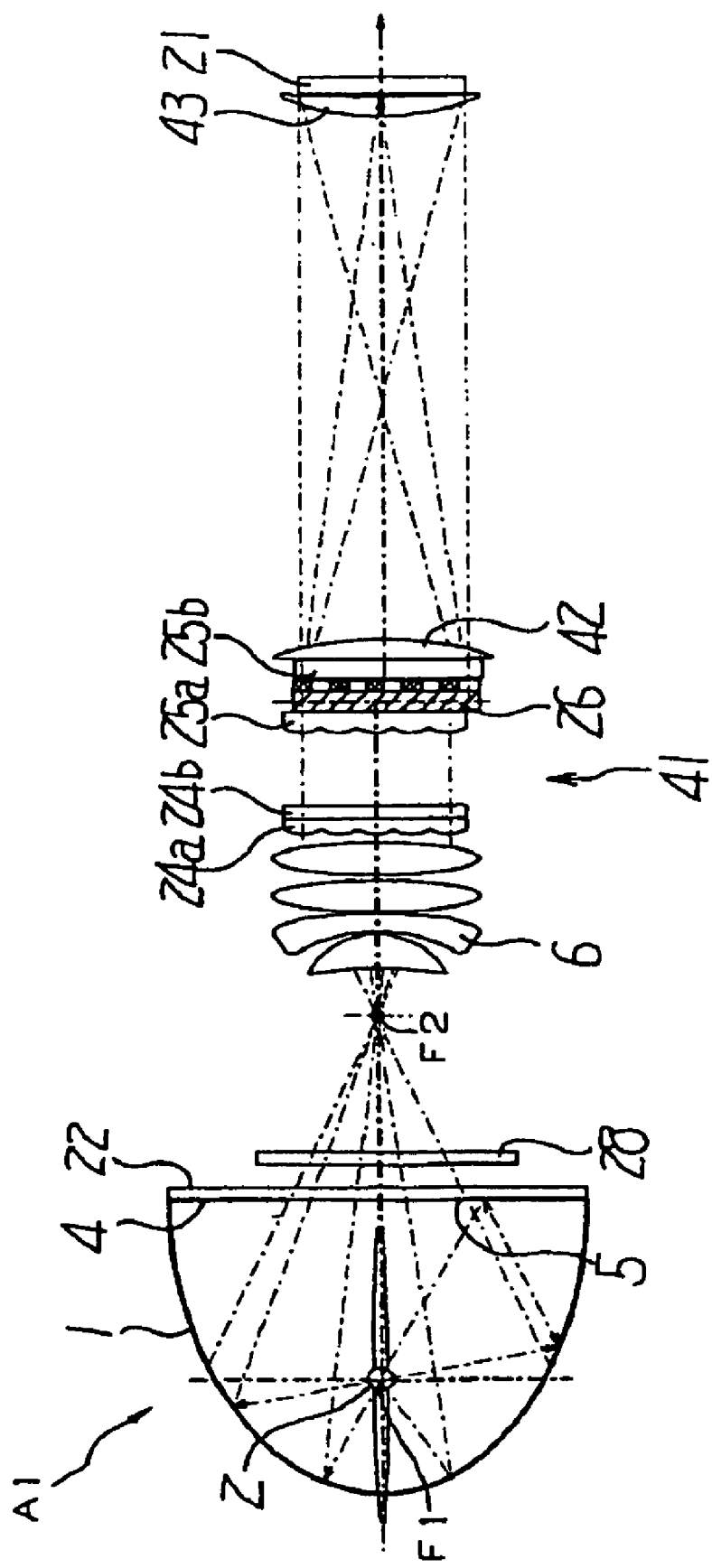
FIG. 39 is a schematic diagram of an optical configuration showing a main part of an illumination apparatus of the nineteenth embodiment of the present invention.

The nineteenth embodiment according to the present invention will be illustrated with reference to FIG. 39 and FIG. 21. The present embodiment shows an application example using the aforementioned illumination apparatus A1 for illuminating a liquid crystal panel or LCD 21.

That is, the illumination apparatus is configured so that the plane mirror 4 is arranged at the minor axis of the ellipsoidal mirror or the reflector 1 and collimation is made by the collimator lens 6 as a collimation means behind the second focal point F2 of an ellipsoidal mirror, and may be the illumination apparatus A3. In the case of the present embodiment, the collimator lens 6 is configured so that the whole corresponds to one convex lens by combining four convex and concave lenses for reducing chromatic aberration. Also, in the present embodiment, the front glass 22 attached to the aperture of the ellipsoidal mirror is directly utilized as the plane mirror 4.

Also, in the case of the present embodiment, an output light utilizing optical system arranged between the illumination apparatus A1 and the liquid crystal panel 21 is an integrator optical system 41 with a polarization converter. Although the integrator optical system 41 may have various configurations, in the present embodiment, the same as the case shown in FIG. 37, the integrator optical system 41 is configured using an orthogonal cylindrical lens arrays 24a, 24b, 25a and 25b and a convex lens 42, of which the focal length matches to a distance from the convex lens 42 to the liquid crystal panel, is arranged immediately behind the last cylindrical lens array 25b. Thus, luminous flux divided into segments by means of the orthogonal cylindrical lens arrays 25a and 25b overlap on the liquid crystal panel 21 being the illuminated surface. A condenser lens for passing luminous flux with the minimum diameter to a projection lens (not shown in FIG. 39) in a liquid crystal projector is also indicated with the numeral 43.

Thus, the method of collimation after focusing once is effective for an illumination apparatus in a field-sequential projector. That is, flickering becomes unnoticeable by setting the color wheel at the focal point.

Herein, similar to the window 12 of the spherical mirror 11, the shape of a window 5 on the plane mirror 4 as the front mirror will be illustrated with reference to FIG. 21 like the eighth embodiment according to the present invention. For a simple illustration, the orthogonal cylindrical lens arrays 24a and 24b as an optical element at the input part of the integrator optical system 41 are replaced with one fly-eye lens-array. Herein, it is assumed that the size of a lens element constituting the aforementioned fly-eye lens-array is H=4 mm in the horizontal direction and V=3 mm in the vertical direction and the fly-eye lens-array is configured so that 7×9 lens elements are arranged.

On such conditions, the basic shape of the window is a rectangular shape of the horizontal side of 4 mm×7=28 mm and the vertical side of 3 mm×9=27 mm. If all lens elements in the shape are utilized, the window 5 on the plane mirror 4 should be made with the ratio of horizontal side to vertical side of 28:27.

However, for a projector using a reflection LCD, the smaller the incidence angle of light entering the surface of the liquid crystal panel 21 is, the more the performance for contrast and color evenness is improved. Hence, the luminous flux passing through a diagonal lens element, of which the incidence angle is relatively large, may not be used. In addition, in the present embodiment, the luminous flux reaching to the diagonal lens element can be reflected, utilized again, and made high-quality luminous flux near the center so that overall efficiency can be improved.

Also, similar to the eighth embodiment according to the present invention, FIG. 21(a) shows an example in which a range covering one diagonal lens element is a reflection surface or a part of the ellipsoidal mirror and FIG. 21(b) shows an example in which a range covering each of three diagonal lens elements is a reflection surface or a part of the ellipsoidal mirror. Herein, numerical values in parenthesis in FIG. 21 are (x, y, l), that is, show x-coordinate, y-coordinate of the corresponding point, and a diagonal length l being symmetric about the original point, respectively.

Furthermore, if the light axis can be set precisely and maintained, it is not necessary to configure the window in the lens element unit shown in FIG. 21(c) or FIG. 21(d). FIG. 21(c) is an example of forming the window 5 in the shape of an ellipsoid or a circle inscribing to the rectangle profile and FIG. 21(d) is an example of dividing the four sets of the three lens elements on the four corners by the diagonal lines and forming the entire window 36 in the shape of an octagon. In the examples of FIG. 21(c) and FIG. 21(d), since luminous flux passes through only a part of a lens element, unevenness of illuminance may be caused in only one lens element, however, the illuminance caused by the convolution with respect to the all lens elements causes little unevenness of illuminance due to mutual compensation.

Particularly, in the example shown in FIG. 21(d), two lens elements located on each of the four corners are in the relationship to compensate its diagonal lens elements completely so that unevenness of illuminance is theoretically not caused at all.

As described above, for a simple illustration, the orthogonal cylindrical lens arrays 24a and 24b as an optical element at the input part of the integrator optical system 41 are replaced with one fly-eye lens-array. However, for the orthogonal cylindrical lens arrays, it is possible to understand that if a similar approach would be applied to an intersection unit of a longitudinal cylindrical lens array and a lateral cylindrical lens array, a similar effect can be obtained so that a detailed description is omitted.

Thus, by shaping luminous flux entering an integrator optical system into a circle or near circle, luminous flux reaching to its periphery is reflected, utilized again, and made high-quality luminous flux near the center so that overall efficiency can be improved.

The present invention is not limited to the specifically disclosed embodiments, and variations and modifications may be made without departing from the scope of the present invention.

The present application is based on Japanese priority applications No.2001-123923 filed on Apr. 23, 2001 and No.2001-263890 filed on Aug. 31, 2001, the entire contents of which are hereby incorporated by reference.

What is claimed is:

1. An illumination apparatus comprising a light source, a reflector of which at least one portion is a first parabolic mirror, an output light utilizing an optical system that comprises an integrator optical system at an entrance thereof, and a front mirror with a fly-eye lens or a member corresponding thereto of the integrator optical system as one unit.

2. The illumination apparatus as claimed in claim 1, wherein the front mirror is a plane mirror.

3. The illumination apparatus as claimed in claim 1, wherein the front mirror is a second parabolic mirror having a focal point common to a focal point of the first parabolic mirror.

4. A liquid crystal projector comprising:
at least one liquid crystal panel for forming an image to be projected,
the illumination apparatus as claimed in claim 1 for illuminating the liquid crystal panel, and
a projection lens system for projecting the image onto a screen.

5. An illumination apparatus comprising a reflector, a light source, a front mirror provided between an exit of the reflector and the light source, and an output light utilizing an optical system comprising an integrator optical system,
wherein the reflector comprises a first parabolic mirror from which collimated light covers at least an entrance of the output light utilizing the optical system and an ellipsoidal mirror that is outside the first parabolic mirror and has a focal point common to that of the first parabolic mirror, and
the front mirror comprises a window transparent to the collimated light.

6. The illumination apparatus as claimed in claim 5, wherein the reflector further comprises a second parabolic mirror that has a focal point common to the focal point of the first parabolic mirror outside the ellipsoidal mirror.

7. The illumination apparatus as claimed in claim 6, wherein a straight line through the focal point and a point on the second parabolic mirror at which a distance from a center of the window is minimum intersects the first parabolic mirror outside an edge line of a hole for inserting the light source.

8. The illumination apparatus as claimed in claim 5, wherein the front mirror is held by a spring.

9. A liquid crystal projector comprising:
at least one liquid crystal panel for forming an image to be projected,
the illumination apparatus as claimed in claim 5 for illuminating the liquid crystal panel, and
a projection lens system for projecting the image onto a screen.

10. An illumination apparatus comprising:
a light source,
a reflector of which at least one portion is a parabolic mirror, and
a front mirror being a plane mirror and having a window transparent to at least one portion of light generated from the light source and reflected from the reflector.

11. A liquid crystal projector comprising:
at least one liquid crystal panel for forming an image to be projected,
the illumination apparatus as claimed in claim 10 for illuminating the liquid crystal panel, and
a projection lens system for projecting the image onto a screen.

12. An illumination apparatus comprising:
a light source,
a reflector of which at least one portion is a first parabolic mirror, and
a front mirror being a plane mirror provided substantially symmetrically with respect to orthogonal axes perpendicular to an optical axis of the first parabolic mirror.

13. A liquid crystal projector comprising:
at least one liquid crystal panel for forming an image to be projected,
the illumination apparatus as claimed in claim 12 for illuminating the liquid crystal panel, and
a projection lens system for projecting the image onto a screen.

* * * * *